(12) United States Patent
Choi et al.

(10) Patent No.: US 11,759,055 B2
(45) Date of Patent: Sep. 19, 2023

(54) PORTABLE LIQUID MIXING DEVICE CAPABLE OF MIXING VARIOUS LIQUIDS

(71) Applicant: 4D CREATOR CO., LTD., Seoul (KR)

(72) Inventors: Wangi Choi, Seoul (KR); Hoonyeol Bae, Seoul (KR)

(73) Assignee: 4D CREATOR CO., LTD., Seoul (KR)

( * ) Notice: Subject to any disclaimer, the term of this patent is extended or adjusted under 35 U.S.C. 154(b) by 644 days.

(21) Appl. No.: 16/966,572

(22) PCT Filed: Jul. 9, 2019

(86) PCT No.: PCT/KR2019/008448
§ 371 (c)(1),
(2) Date: Jul. 31, 2020

(87) PCT Pub. No.: WO2020/040425
PCT Pub. Date: Feb. 27, 2020

(65) Prior Publication Data
US 2020/0359839 A1    Nov. 19, 2020

(30) Foreign Application Priority Data
Aug. 21, 2018  (KR) .......................... 10-2018-0097381

(51) Int. Cl.
*A47J 43/00* (2006.01)
*A47J 43/042* (2006.01)
(Continued)

(52) U.S. Cl.
CPC ............. *A47J 43/042* (2013.01); *A47J 43/08* (2013.01); *B01F 23/452* (2022.01); *B01F 33/45* (2022.01);
(Continued)

(58) Field of Classification Search
CPC ......... A47J 43/042; A47J 43/08; B01F 33/45; B01F 35/3204; B65D 81/3288
See application file for complete search history.

(56) References Cited

U.S. PATENT DOCUMENTS

| 6,402,364 B1* | 6/2002 | Esclar | B01F 31/441 366/276 |
| 2015/0117140 A1* | 4/2015 | Asada | B01F 35/7163 366/176.3 |

FOREIGN PATENT DOCUMENTS

| JP | 2000-313487 A | 11/2000 |
| JP | 2015-530287 A | 10/2015 |

(Continued)

*Primary Examiner* — Anshu Bhatia
(74) *Attorney, Agent, or Firm* — KORUS Patent, LLC; Seong Il Jeong

(57) ABSTRACT

The present invention relates to a portable liquid mixing device capable of mixing different types of various liquids, and the different types of various liquids may include various beverages. The present invention includes a plurality of containers configured to contain respective specific liquids, a selection unit configured to select any one of the plurality of containers, a control unit configured to control the introduction of a selected liquid into a mixing container, and a mixing unit configured to mix various liquids introduced into the mixing container. According to the present invention, different types of liquids may be mixed together. In particular, beverages having various flavors are put into respective containers, mixed together and then drunk. Furthermore, a scale is marked on the surface of the mixing container, and thus the amount of liquid may be accurately measured, so that liquids may be mixed at an accurate ratio.

5 Claims, 22 Drawing Sheets

(51) Int. Cl.

| | | |
|---|---|---|
| *A47J 43/08* | (2006.01) | |
| *B65D 81/32* | (2006.01) | |
| *B01F 23/45* | (2022.01) | |
| *B01F 33/45* | (2022.01) | |
| *B01F 35/50* | (2022.01) | |
| *B01F 35/83* | (2022.01) | |
| *B01F 35/221* | (2022.01) | |
| *B01F 35/32* | (2022.01) | |
| *B01F 101/14* | (2022.01) | |

(52) U.S. Cl.
CPC ...... *B01F 35/2211* (2022.01); *B01F 35/3204* (2022.01); *B01F 35/514* (2022.01); *B01F 35/831* (2022.01); *B65D 81/3288* (2013.01); *B01F 2101/14* (2022.01)

(56) References Cited

FOREIGN PATENT DOCUMENTS

| KR | 20-0247285 Y1 | 10/2001 |
|---|---|---|
| KR | 20-0480558 Y1 | 6/2016 |

\* cited by examiner

PORTABLE LIQUID MIXING DEVICE CAPABLE OF MIXING VARIOUS LIQUIDS

TECHNICAL FIELD

The present invention relates to a portable liquid mixing device that is capable of mixing various liquids.

BACKGROUND ART

In general, beverage containers are containers for storing, distributing and selling alcoholic beverages, beverages, drinking water, etc., and are configured to allow a liquid to be drunk after a stopper has been opened. Such beverage containers usually include a body configured to have an internal space therein and an outlet formed in one side of the body and configured to be selectively opened and closed by a stopper.

However, these beverage containers have single bodies, and thus heterogeneous beverages cannot be stored separately, so that it is not possible to satisfy diversified consumer tastes and desires. A problem arises in that it is difficult to provide a variety of beverage foods to consumers who have strong desires to taste various beverages in a variety of ways, thereby increasing the inconvenience of providing beverage foods in multiple cups or containers, respectively.

Recently, in order to satisfy the diversified consumer tastes and desires in terms of consumption, a space-segmented beverage container having a double inner space formed to store heterogeneous beverages in one container has been introduced. The space-divided beverage container has a structure in which a partition is disposed in the center of the container body and divides an interior space.

Researchers of the present invention have completed the present invention after conducting repeated research to satisfy the more diverse tastes of consumers.

DISCLOSURE

Technical Problem

The present invention relates to a portable liquid mixing device that is capable of mixing various liquids.

Technical Solution

In order to accomplish the above object, according to an aspect of the present invention, there is provided a liquid mixing device capable of mixing a plurality of liquids, the liquid mixing device including: a first container configured to contain a first liquid; a second container configured to contain a second liquid; a selection unit connected with the first container and the second container via a first connection pipe and a second connection pipe, respectively, and configured to have a selective accommodation space that receives and accommodates the first liquid by selectively opening only the first connection pipe and/or also receives and accommodates the second liquid by selectively opening only the second connection pipe; a control unit configured to control the introduction of a selected liquid into a mixing container; the mixing container configured to receive the first liquid and/or second liquid from the selection unit and store and mix the first liquid and/or second liquid; and a mixing unit configured to mix liquids inside the mixing container; wherein the first liquid is introduced into the mixing container by selectively opening only the first connection pipe, the second liquid is introduced into the mixing container by selectively opening the second connection pipe, and the first liquid and the second liquid are mixed together.

According to the present aspect, the selection unit includes an outer member and an inner member mounted inside the outer member, and the outer member and the inner member are coupled to each other so that they are slidable when they are rotated; the outer member has a cylindrical shape, and includes: a plurality of outer through holes configured to communicate with the first connection pipe or second connection pipe; a plurality of second arms formed on an outer circumferential surface thereof, and connected to the first arms of the side case; second magnet depressions formed on the second arms, and mounted with second magnets; and an inner circumferential groove formed along an inner circumferential surface thereof; and the inner member has a cylindrical shape, and includes: one inner through hole formed in a cylindrical wall thereof to correspond to the outer through holes; a lower communication hole formed by extending a circumference of a lower end of a cylinder toward a center to a predetermined length; a lower communication portion formed by extending an inner circumference of the lower communication hole downward to a predetermined length; a plurality of communication radial holes formed in a cylindrical wall of the lower communication portion; and an outer circumferential strip formed along an outer circumferential surface thereof, and slidably coupled to the inner circumferential groove.

According to the present aspect, the control unit may include: a control disk configured to have the same diameter as a diameter of the lower communication hole and thus seal the lower communication hole; a support rod configured to support the control disk; and a grip portion connected to the support rod via a connection rod and configured to control movement of the control disk.

According to the present aspect, the mixing container is configured such that it is made of a transparent material and has a cylindrical shape, a scale is marked on the surface thereof, a limit protrusion configured to limit the movement of the control unit is formed on the outer circumferential surface thereof, and a sealing portion is coupled to the lower end thereof to prevent the liquid from leaking to an outside.

According to the present aspect, the mixing unit may include: an outer rotor located outside the mixing container, and configured to have magnets having different polarities and to be rotated by driving of a motor; and an inner rotor located inside the mixing container, and configured to have magnets having different polarities and to be rotated according to rotation of the outer rotor.

According to the present aspect, the liquid mixing device may further include a side case configured to accommodate the first container or the second container; the side case may further include a traction member formed in each of the first arms and configured to promote upward rotation of the side case; and the traction member may include a first magnet depression configured such that a first magnet is mounted therein; and a rotation limiting protrusion configured to limit the upward rotation of the side case to a predetermined degree.

According to the present aspect, the liquid mixing device may further include a lower case, the lower case may have a cylindrical structure in which the top thereof is opened upward and the bottom thereof is blocked, a support coupling portion configured to be coupled with the sealing portion may be provided at the center thereof, a motor may be vertically mounted inside the support coupling portion, a switch configured to operate the motor through turning on and off of power may be mounted on the side wall thereof, and a protrusion may be formed at the upper end of the side wall and engaged with a depression at the lower end of the side case.

Advantageous Effects

According to the present invention, different types of liquids may be mixed together. In particular, beverages having different flavors may be put into respective containers, mixed, and drunk. Alternatively, it may also be possible to selectively drink only a preferred liquid among various beverages without mixing them.

Furthermore, a scale is marked on the surface of the mixing vessel, and thus the amount of each liquid may be accurately measured, so that individual liquids may be mixed at an accurate ratio.

Moreover, when ice (cold water) or high-temperature water is put into the mixing container, liquids, such as beverage coffee, may be kept cold or warm due to the cold or warmth of the ice (cold water) or high-temperature water, and thus the portable liquid mixing device may be utilized as a cold-keeping device or warmth-keeping device.

MODE FOR INVENTION

Figure 1:
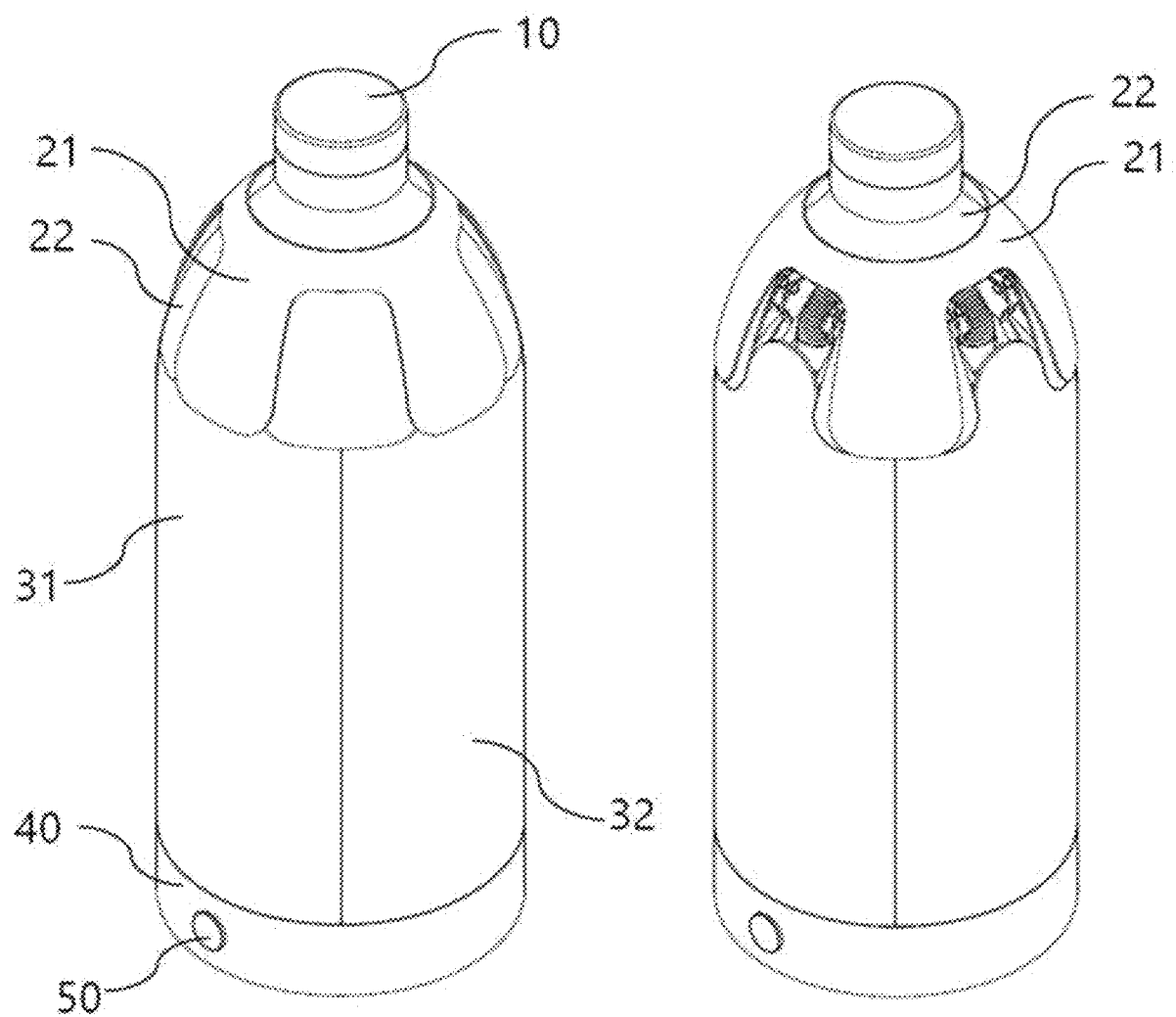
FIG. 1 is a perspective view of a portable liquid mixing device according to an aspect of the present invention (wherein the left side thereof shows a state in which an upper portion is covered by upper cases, and the right side thereof shows a state in which parts of the upper portion are exposed to the outside)

Preferred embodiments of the present invention will be described below with reference to the accompanying drawings. Embodiments of the present invention may be modified in various other forms, and the scope of the present invention is not limited to the embodiments described below. Embodiments of the present invention are provided to more fully describe the present invention to those having ordinary skill in the art. Accordingly, the shapes and sizes of elements in the drawings may be exaggerated for clear description, and elements indicated by the same reference symbols in the drawings are the same elements. In the present invention, the expression "first" or "second" does not mean the sequential position or importance thereof, but is merely intended to distinguish a corresponding element.

The present invention relates to a portable liquid mixing device capable of mixing a plurality of types of various liquids. The various liquids may include various beverages.

Figure 2:
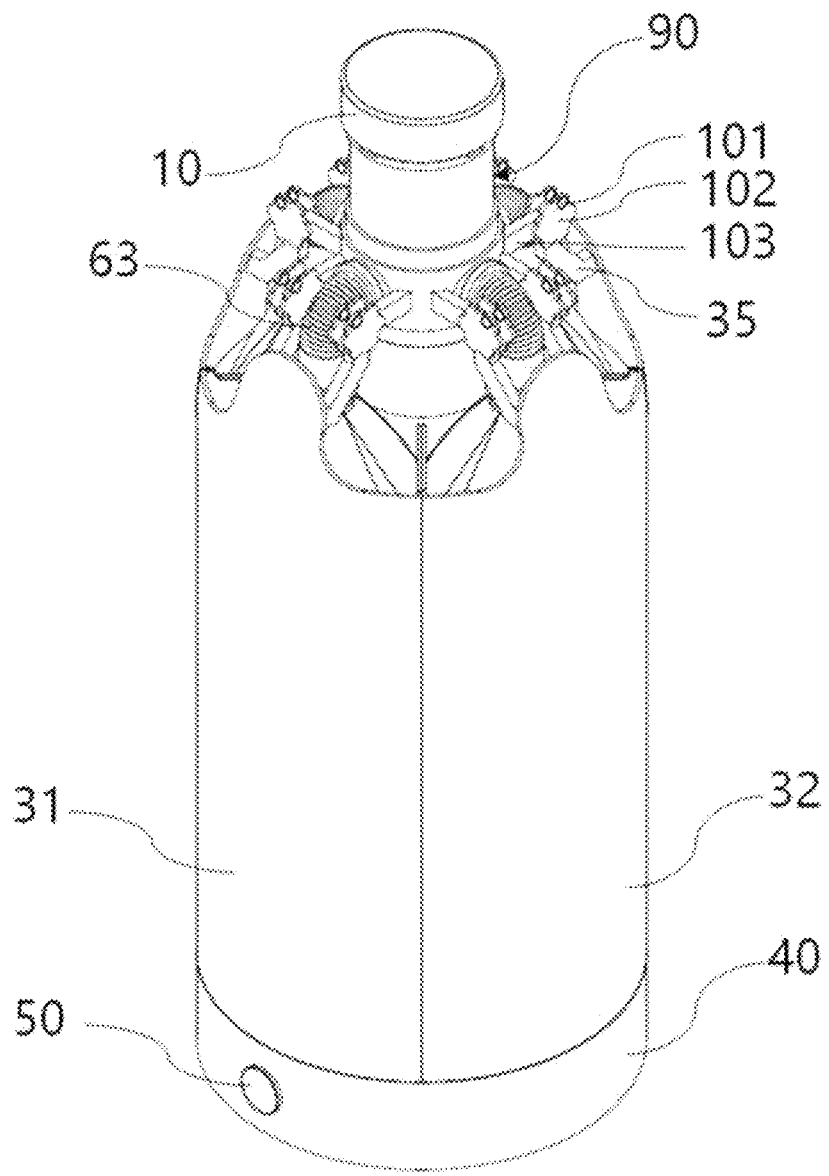
FIG. 2 is a perspective view showing a state in which the upper cases are removed from the portable liquid mixing device according to the aspect of the present invention.
Figure 3:
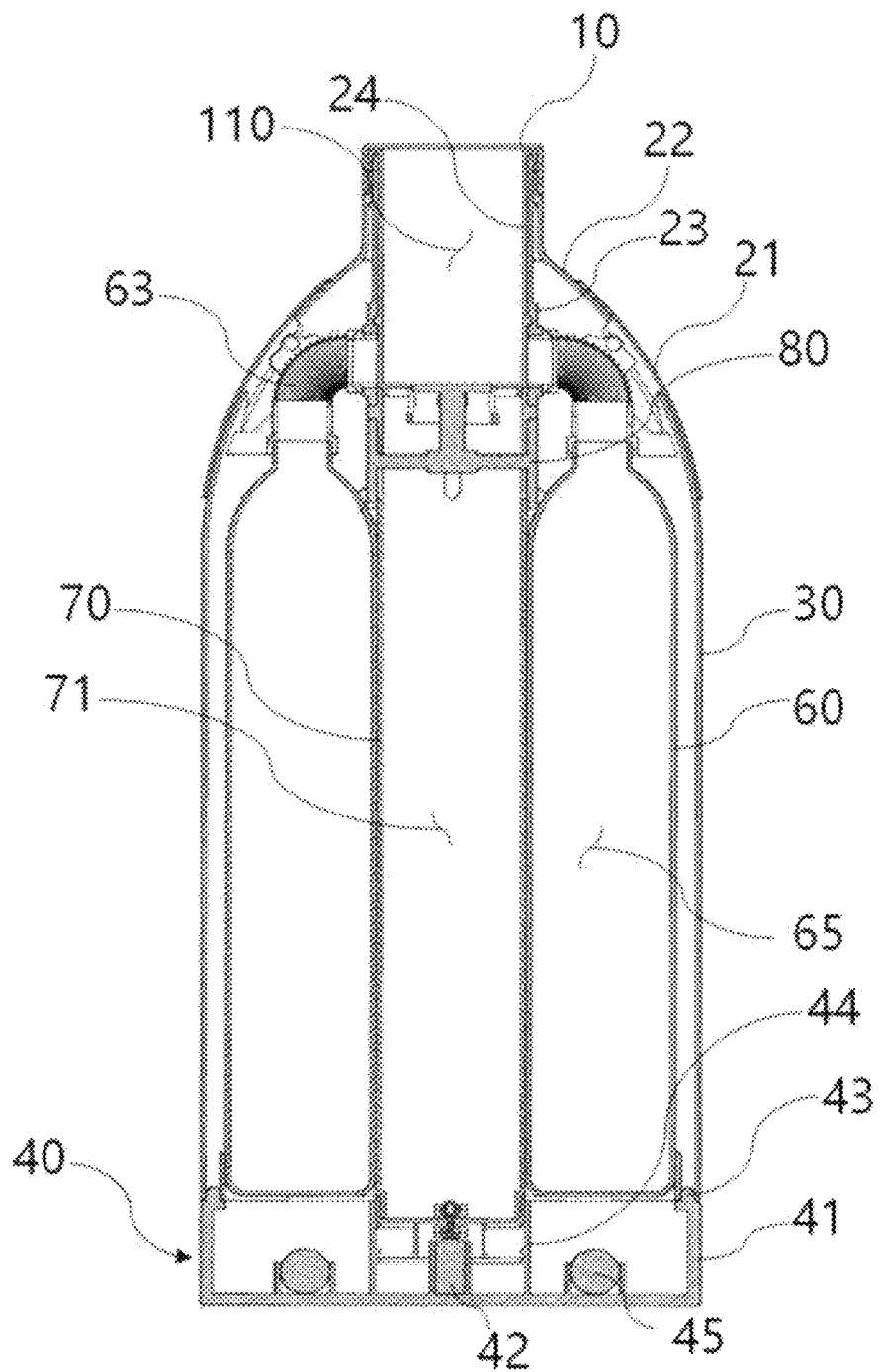
FIG. 3 is a sectional view of the portable liquid mixing device according to the aspect of the present invention.
Figure 4:
FIG. 4 is a sectional view of FIG. 3 that is colored.

In FIG. 1, there is shown a perspective view of a portable liquid mixing device according to an aspect of the present invention. The left side of FIG. 1 shows a state in which an upper portion is covered by an inner upper case 22 and an outer upper case 21, and the right side thereof shows a state in which the outer upper case 21 is rotated by 45 degrees. Side cases 31 and 32 may be prevented from interfering with each other while being raised upward by rotating the outer upper case 21 by 90 degrees. FIG. 2 shows a state in which the upper cases are removed from the portable liquid mixing device according to the aspect of the present invention. FIG. 3 is a sectional view of the portable liquid mixing device according to the aspect of the present invention, and FIG. 4 shows FIG. 3 that is colored.

The portable liquid mixing device of the present invention may include a plurality of containers 60 configured to contain specific liquids, respectively, a selection unit 90 configured to select any one of the plurality of containers, a control unit 80 configured to control the introduction of selected liquids into a mixing container 70, and a mixing unit configured to mix the plurality of liquids introduced into the mixing container 70.

The portable liquid mixing device is a device that contains different liquids in a plurality of respective containers and, in the process of carrying and moving it, mixes the liquids at the desired ratio and allows a user to drink a mixture or allows a mixture to be used for a specific purpose. Furthermore, it may also be possible to selectively drink only a preferred liquid among various beverages without mixing them.

The plurality of containers 60 may contain various different types of liquids. For example, the liquids may be beverages that can have various flavors. More specifically, they may include various beverages, such as a coffee-flavored beverage, a lemon-flavored beverage, a peppermint-flavored beverage, an apple-flavored beverage, sikhye, and sujeonggwa. Additionally, liquid condiments, such as vinegar and soy sauce, may be stored, mixed and used in the containers 60. The portable liquid mixing device may also be used to contain different types of alcoholic beverages in the respective containers, mix them at a predetermined ratio to produce a cocktail and drink the cocktail. The material of the containers may be plastic that is harmless to the human body. However, it is not limited thereto, but may be a metal material such as aluminum. When the fact that the portable liquid mixing device is portable is taken into consideration, a plastic material may be desirable to reduce weight.

Figure 5:
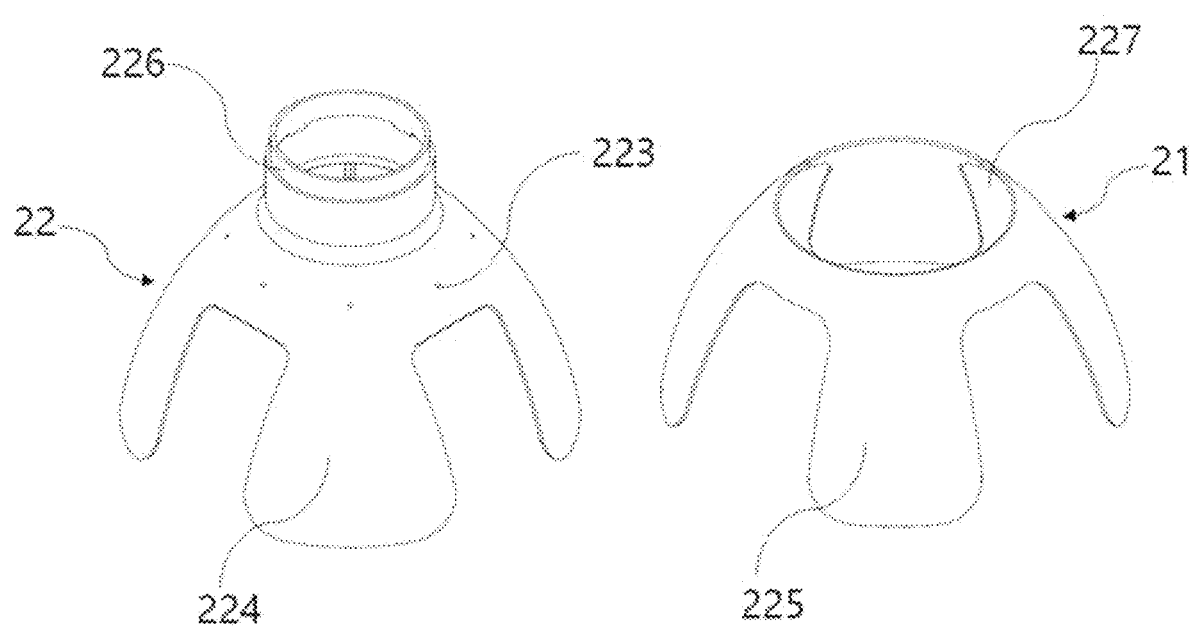
FIG. 5 is a view of the upper case of the portable liquid mixing device according to the aspect of the present invention (wherein the left side thereof shows an inner upper case and the right side thereof shows an outer upper case)

FIG. 5 shows upper cases. The left side of FIG. 5 shows the inner upper case 22 that is coupled with the selection unit 90, and the right side thereof shows the outer upper case 21 that is coupled over the inner upper case.

Each of the upper cases may have a structure in which a plurality of legs 224 or 225 is formed. For example, four legs may be formed at intervals of 90 degrees. When the inner upper case 22 and the outer upper case 21 are disposed not to overlap each other, the inside may be hidden by the legs 224 of the inner upper case and the legs 225 of the outer upper case.

A plurality of opening/closing depressions 223 may be formed in the outer surface of the inner upper case 22, and opening/closing protrusions (not shown) may be formed on the inner surface of the outer upper case 21 to correspond to the opening/closing depressions 223. On the contrary, opening/closing protrusions may be formed on the inner upper case and opening/closing depressions may be formed in the outer upper case.

When the legs are four in number, eight opening/closing depressions 223 and eight opening/closing protrusions may be formed at predetermined intervals, i.e., at intervals of 45 degrees. This makes it easy and accurate to rotate in 45-degree increments, thereby enabling opening and closing. In other words, when any one of the inner upper case 22 and the outer upper case 21 is rotated by 45 degrees in an open state in which the legs of the inner upper case 22 and the outer upper case 21 overlap each other, the locations of the legs do not overlap each other and thus the inside is hidden.

Although a case where the legs are four in number (side cases are four in number) has been described herein, the present invention is not limited thereto. When the legs are three in number (side cases are three in number), six opening/closing depressions 223 and six opening/closing protrusions may be formed, in which case the switching of opening and closing occurs every 60 degrees.

The inner upper case 22 may have a coupling portion 226 that is coupled to the selection unit 90. The coupling portion 226 may have a cylindrical shape, and may be coupled to the upper portion of the outer circumferential surface of the outer member 23 of the selection unit 90. In this case, a coupling strip 108 may be formed on the outer circumferential surface of the outer member 23 of the selection unit along the outer circumferential surface so that the coupled inner upper case does not move downward. A lid 10 may be coupled to the inner upper case 22, and the liquids contained inside the containers may be prevented from leaking to the outside by the lid.

Figure 6:
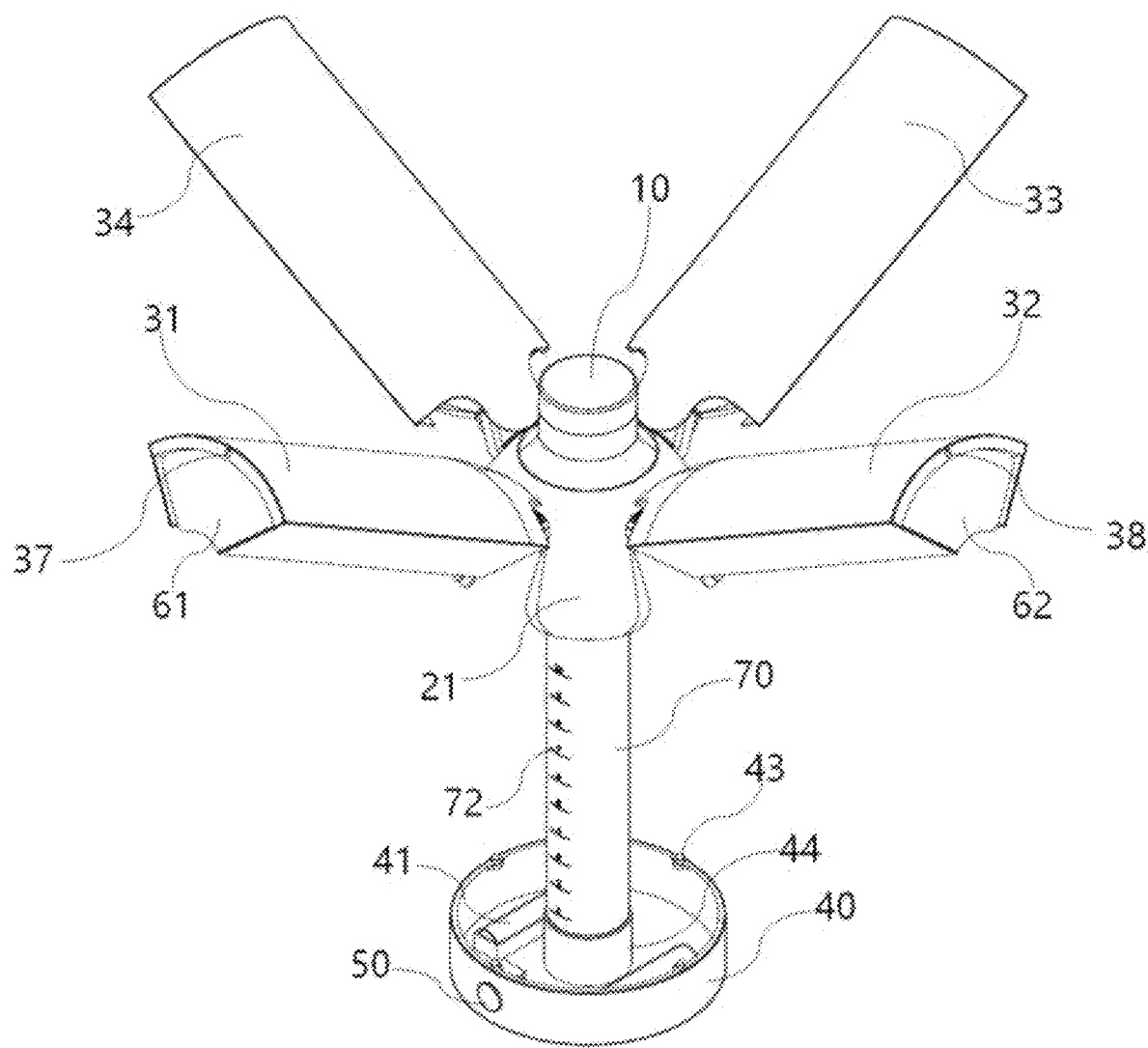
FIG. 6 is a perspective view of a state in which the side case of the portable liquid mixing device according to the aspect of the present invention is spread and raised.
Figure 7:
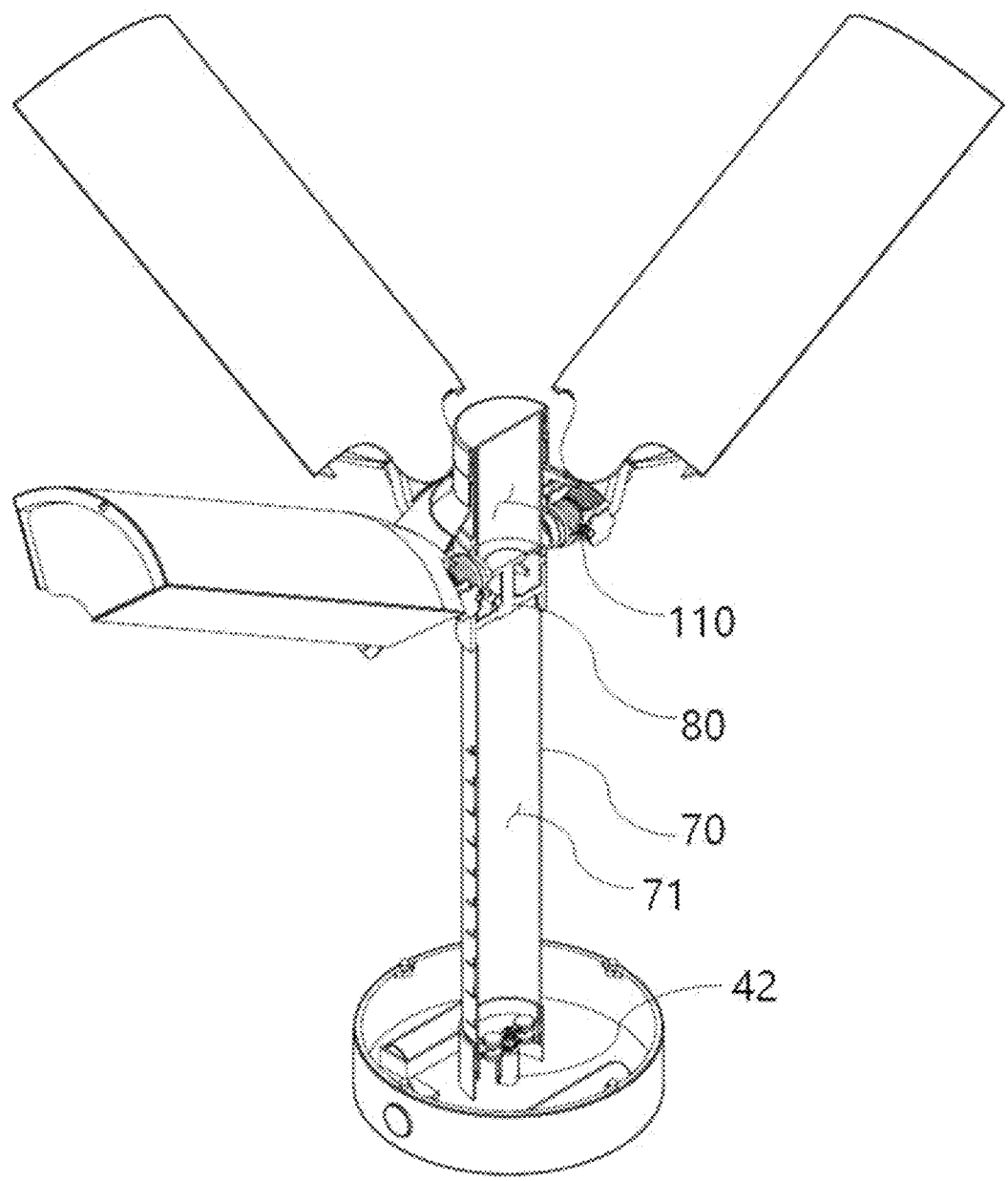
FIG. 7 is a partial sectional view of the center portion of FIG. 6.
Figure 8:
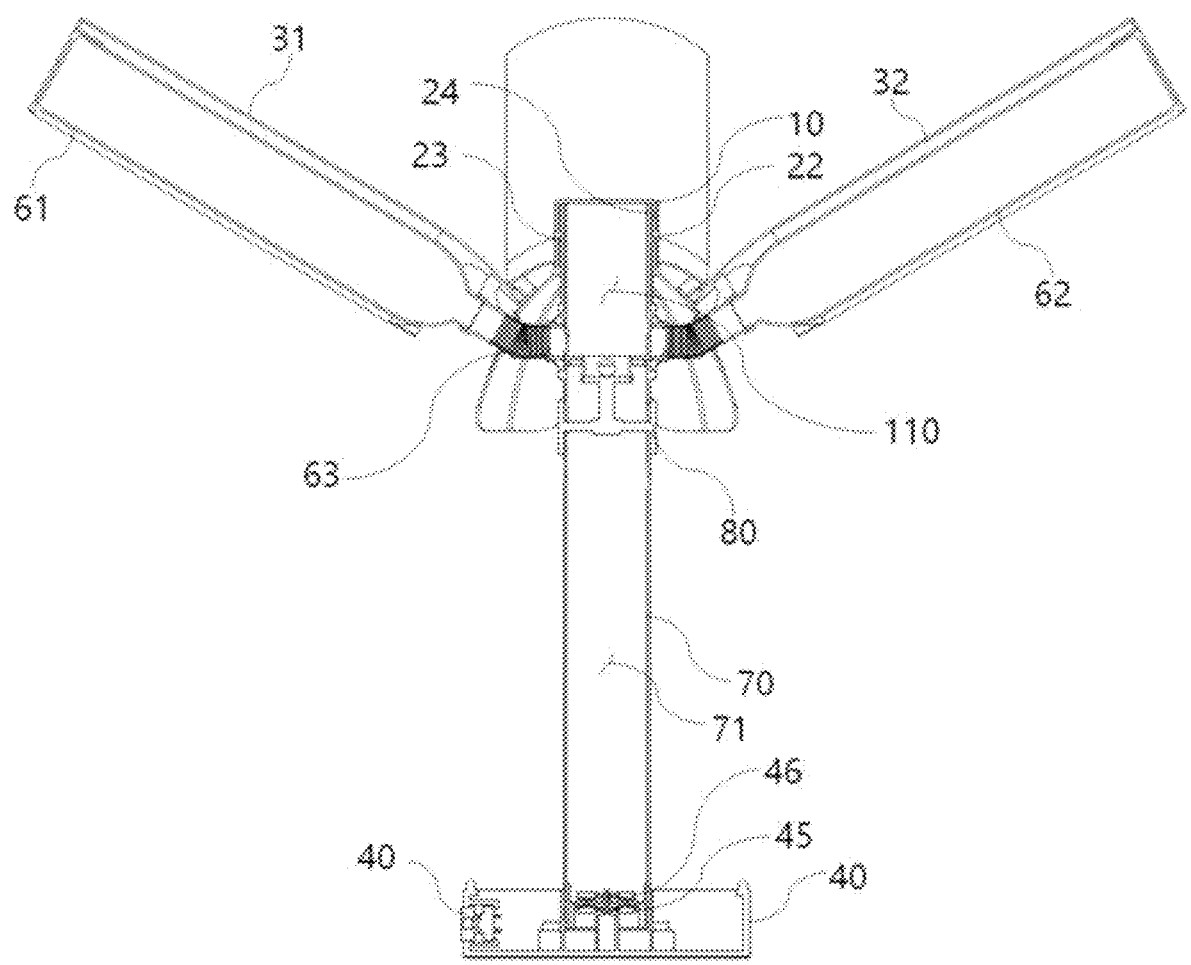
FIG. 8 is a sectional view of FIG. 6.

FIGS. 6 to 8 show a state in which a side case 30 is raised in various manners. FIG. 6 shows a perspective view of the state in which the side case 30 is raised, FIG. 7 shows a partial sectional view of the center portion, and FIG. 8 shows a sectional view of the state in which the side case 30 is raised. In order to raise the side case 30, the protrusions 43 of the lower case and the lower end depressions 35 and 36 of the side case 30 are disengaged from each other by slightly pulling the lower case 40 downward. Thereafter, when the side case 30 is slightly lifted upward, the side case 30 raised by attractive force between a second magnet mounted on the second arm 103 of the outer member 23 of the selection unit and a first magnet mounted on a traction member 102 mounted on the first arm 33 of the side case 30. The side case 30 is not further raised and stopped after being raised to a predetermined level by a rotation limiting protrusion 109 formed on the traction member 102.

The selection unit 90 may include the outer member 23 and an inner member 24 mounted in the outer member 23. The inner member 24 and the outer member 23 are in close contact with each other, but sliding may occur when rotating. A specific liquid can be selected from various liquids through the selection unit. The selected liquid may flow into an accommodation space inside the selection unit via an inlet. The outer member may have a number of outer through holes 120 equal to the number of containers containing the liquids. The plurality of outer through holes 120 may be disposed at the same intervals. For example, in the case of four containers, four outer through holes 120 may be formed, and the outer through hole 120 may be disposed at intervals of 90 degrees. The outer through holes 120 may communicate with the containers through corrugated pipes. Only one inner through hole 130 may be formed in the inner member. The inner through hole 130 may be formed to correspond to the outer through holes 120. When the inner member is rotated, the inner through hole 130 may also be rotated. When the inner through hole 130 is matched to a specific outer through hole 120 by rotating the inner member, the container communicating with the corresponding outer through hole 120 may be selected, and thus a liquid contained in a corresponding container may be selectively introduced into the accommodation space 110 of the selection unit. In other words, a specific liquid may be selectively introduced via the selection unit. Thereafter, another liquid may be selectively introduced by rotating the inner member 24 by 90 degrees. When a specific liquid is selected and discharged directly to the outside through an outlet as described above, the portable liquid mixing device may be used for applications such as an application in which only the specific liquid is drunk. As a specific example, a user may select and drink only a specific beverage preferred by him or her while carrying the portable liquid mixing device with various beverages contained in the containers.

Figure 9:
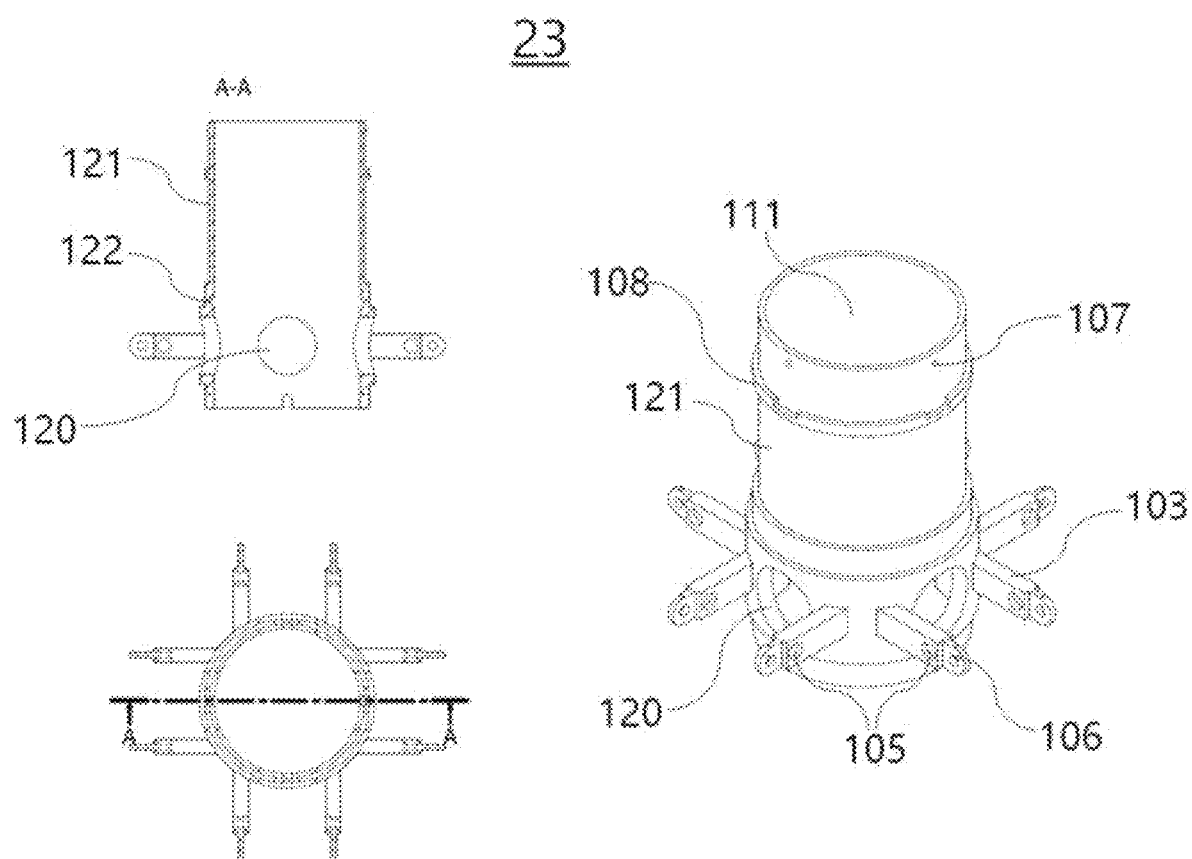
FIG. 9 is a view showing the outer member of a selection unit in the portable liquid mixing device according to the aspect of the present invention.

FIG. 9 shows the outer member 23 of the selection unit. The outer member 23 has a cylindrical shape and is opened upward to form an outlet 111, and a liquid or the like may be discharged through the outlet. The plurality of outer through holes 120 may be formed at the same intervals in the lower wall of the cylinder of the outer member 23. For example, when the outer through holes are four in number, they may be formed at intervals of 90 degrees. The outer through hole 120 may communicate with the container 60 via a connection pipe (corrugated pipe) 63. The liquid contained in the container 60 may be sequentially introduced through the connection pipe (corrugated pipe) 63 and the outer through hole 120 into the accommodation space 110 in the selection unit. The number of outer through holes 120 may be the same as the number of containers 60. Although the four outer through holes are shown in FIG. 9, the present invention is not limited thereto.

Furthermore, a plurality of second arms 103 may be formed on the outer circumferential surface of the upper portion of the outer member. A pair of second arms 103 may be formed on the left and right sides of each of the outer through holes 120. The second arms 103 may be coupled to the first arms 35 of the side case 30.

A second magnet depression 105 may be formed in the second arm 103, and a second magnet may be mounted into the second magnet depression. A first magnet depression 101 may be formed in the traction member 15 mounted on each of the first arms 35 of the side case 30, and may accommodate a first magnet (not shown). The first and second magnets have opposite polarities, and thus attractive force acts on each other, so that the side case may be easily raised upward by the attraction between the magnets. In other words, the traction member 102 may apply a force to promote rotation when the side case is rotated upward. In an early stage, when the side case is raised, it is started by applying an external force through a person's hand. However, when the side case starts to be raised, the side case 30 may be naturally rotated upward by the force applied to the traction member 102. When the side case is raised upward, the liquids present in the containers 60, 61, and 62 in the side case 30 may move to the accommodation space 110 in the selection unit through the corrugated pipe 63.

A plurality of fine protrusions 107 may be formed at the same interval on the outer circumferential surface of the upper portion of the outer member 23. The number of fine protrusions 107 is the same as the number of containers (the number of outer through holes 120). When the containers are four in number, they may be formed at intervals of 90 degrees. Fine depressions 136 that may be fitted over the fine projections 107 are formed in the inner member 24. The reason for forming the fine protrusions 107 is to allow the inner member 24, which is coupled with the outer member 23 and slides when rotated, to be accurately rotated by a predetermined angle. The locations where the outer through holes 120 and the inner through hole 230 are formed may be set to correspond to the locations where the fine protrusions 107 of the outer member 23 and the fine depressions 136 of the inner member are fitted to each other when the inner member 24 is rotated. An inner circumferential groove 122 may be formed along the inner circumferential surface of the outer member 23, and an outer circumferential strip 132 formed on the outer circumferential surface of the inner member 24 may be coupled thereto.

Figure 10:
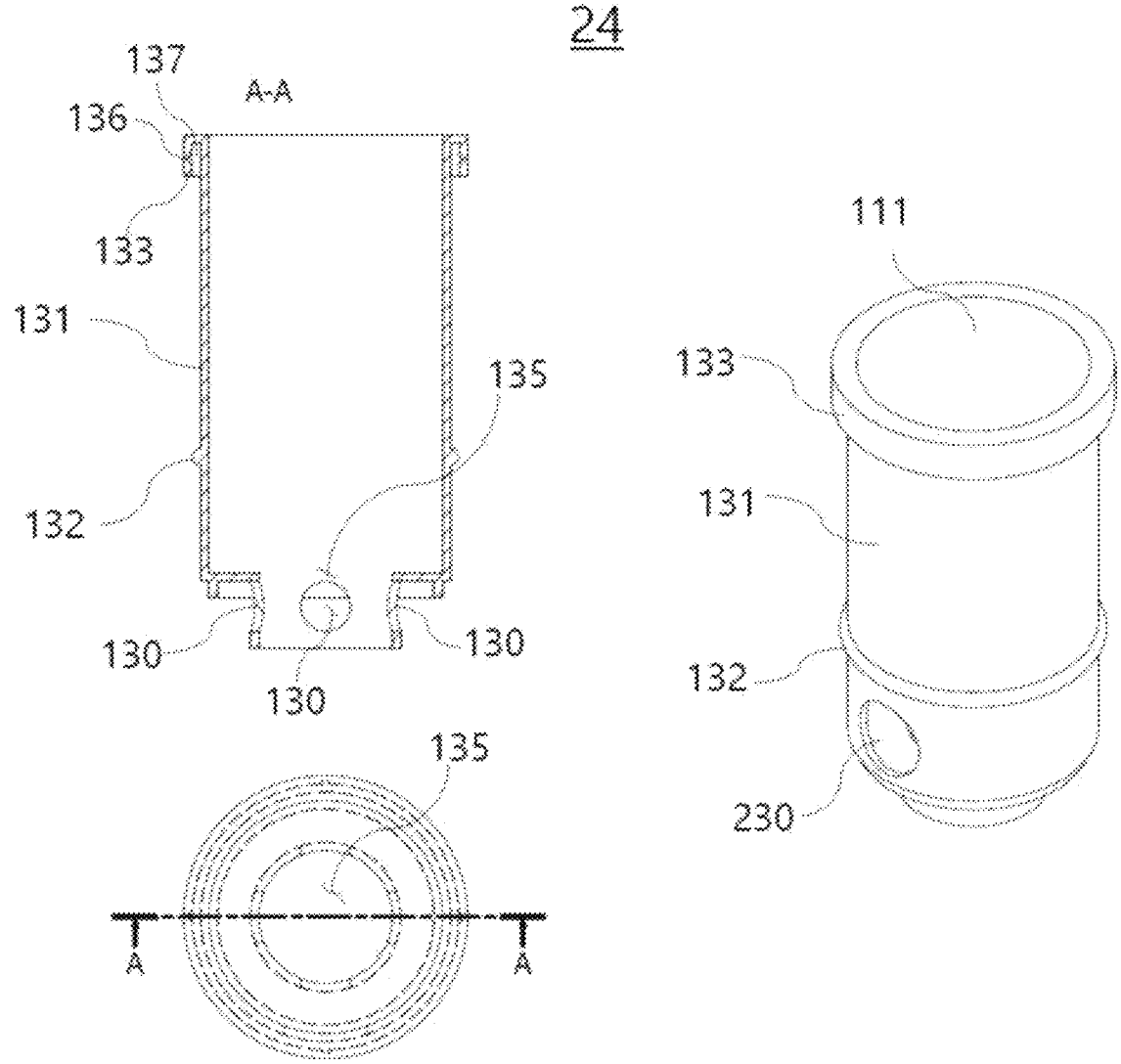
FIG. 10 is a view showing the inner member of the selection unit in the portable liquid mixing device according to the aspect of the present invention.

FIG. 10 shows the inner member 24 of the selection unit. The inner member may have a cylindrical body portion 131, and may be opened upward to form an outlet 111. The upper end of the body portion of the inner member 24 may be radially extended outward, bent downward and extended to form a bent portion 133. Due to this, a groove 137 may be formed with respect to the outer peripheral surface of the body portion 131. The groove 137 may be formed to surround the outer surface of the upper end of the inner member. When the inner member 24 and the outer member 23 are assembled together, the upper end of the outer member 23 may be inserted into and coupled to the groove 24 of the inner member. The inner member 24 and the outer member 23 are slidable when being rotated after the assembly.

Furthermore, fine depressions 136 may be formed inside the groove of the bent portion 133. The fine protrusions 107 of the outer member may be inserted into and coupled to the fine depressions 136. A number of fine depressions 136 equal to the number of fine protrusions 107 may be formed. When the fine protrusions 107 are four in number, four fine grooves 136 may also be formed. When the inner member 24 and the outer member 23 are rotated and slide, they may be stopped at the location where the fine protrusion 107 and the fine groove 136 are coupled to each other. In this case, when force is further applied, rotational sliding is continued. When a subsequent fine protrusion 107 and a subsequent fine depression 136 are coupled to each other, stopping is performed. As a result, a rotational location may be accurately controlled.

The inner through hole 230 may be formed in the cylindrical wall of the inner member 24. The inner through hole 230 may be one in number. The inner through hole 230 may be formed to correspond to one of the outer through holes 120. The inner layer through hole 230 is one in number, and the outer through holes 120 are plural in number. For example, the outer through holes 120 may be four in number. When one outer through hole 120 is selected from the plurality of outer through holes 120 and the location of the inner member 24 is aligned with the selected outer through hole 120 while the inner member 24 is being rotated, the liquid of the container connected to the outer through hole 120 may be selected, and then the selected liquid may be moved (introduced) into the accommodation space 110 of the selection unit through the connecting pipe 63.

Furthermore, the outer circumferential strip 132 may be formed along the outer circumferential surface of the inner member 24, and may be inserted into and coupled to the inner circumferential groove 122 formed along the inner circumferential surface of the outer member. By this coupling, the inner member 24 and the outer member 23 may be prevented from mutual movement that may occur in the vertical direction, thereby allowing a stable state to be maintained.

The circumference of the bottom of the cylinder of the body portion 131 of the inner member 24 may be bent toward the center and extended to a predetermined length to form the lower communication hole 135. The inner circumference of the lower communication hole 135 may extend downward to a predetermined length to form a lower communication portion. The diameter of the lower communication hole 135 may be smaller than the diameter of the body portion 131. The lower communication portion may also have a cylindrical shape. A plurality of communication radial holes 130 may be formed at regular intervals in the cylindrical wall. For example, four communication radial holes may be formed. The larger the number of communication radial holes 130, the faster the mass transfer through them. The control disk 82 of the control unit 80 may be coupled to the lower communication portion. The diameter of the control disk may be the same as the diameter of the lower communication hole 135 and the lower communication portion. Accordingly, the control disk 82 may seal the lower communication hole 135, thereby preventing the leakage of liquid. When the control disk 82 is passed through the communication radial hole 130 and located at the end of the lower communication portion by moving the control unit 80 downward, the accommodation space 110 of the selection unit and the mixing space 70 of the mixing container 70 are connected and communicate through the lower communication hole 135 and the communication radial hole 130, and thus material may be moved therethrough. The liquid in the accommodation space 110 may be moved to the mixing container 70 through the lower communication hole 135 and the communication radial hole 130, and vice versa.

Figure 11:
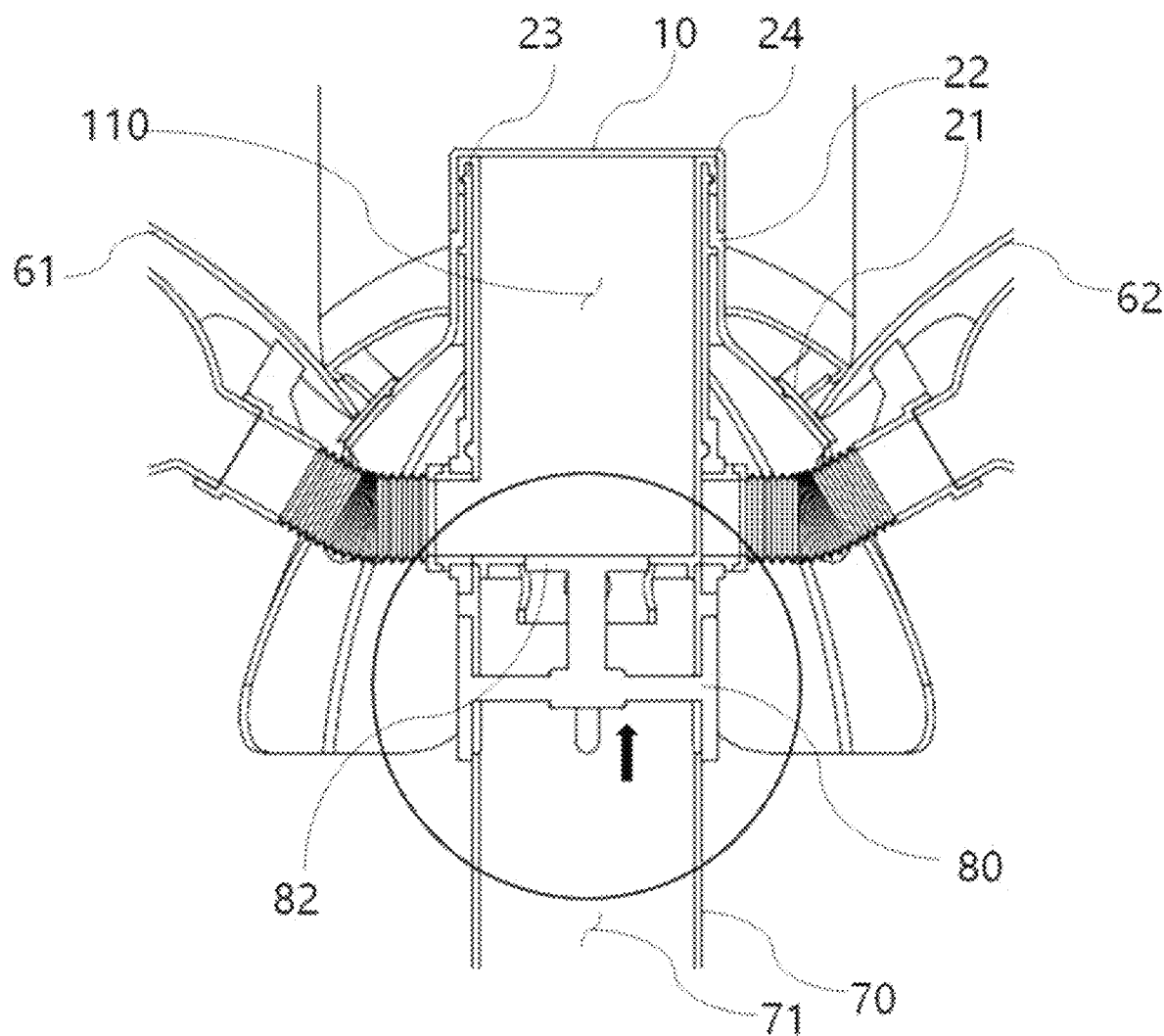
FIG. 11 is an enlarged sectional view showing a state in which a lower communication hole is closed in the portable liquid mixing device according to the aspect of the present invention.

FIG. 11 shows a state in which the lower communication hole 135 is closed. Referring to FIG. 11, since the control unit is pushed upward and the control disk 82 of the control unit 80 closes and seals the lower communication hole 35 of the inner member 24 of the selection unit 110, the liquid present in the accommodation space 110 may not be moved into the mixing space 71 of the mixing container 70. Furthermore, in FIG. 11, the left side of the inner member of the selection unit is open, from which it can be determined that a left container is selected. Accordingly, the liquid in the left container may be moved to the accommodation space 110 of the selection unit. However, since the lower communication hole 135 is sealed by the control disk 82, the liquid in the left container only remains in the accommodation space 110 and may not be moved to the mixing space 71 of the mixing container 70. When the liquid is discharged directly to the outside through the outlet in the above state, the portable liquid mixing device may be used for applications such as an application in which only the specific liquid is drunk. As a specific example, a user may select and drink only a specific beverage preferred by him or her while carrying the portable liquid mixing device with various beverages contained in the respective containers. In other words, the device according to an aspect of the present invention may be used to mix a plurality of liquids or select only a specific liquid and to drink a mixture or the specific liquid.

Figure 12:
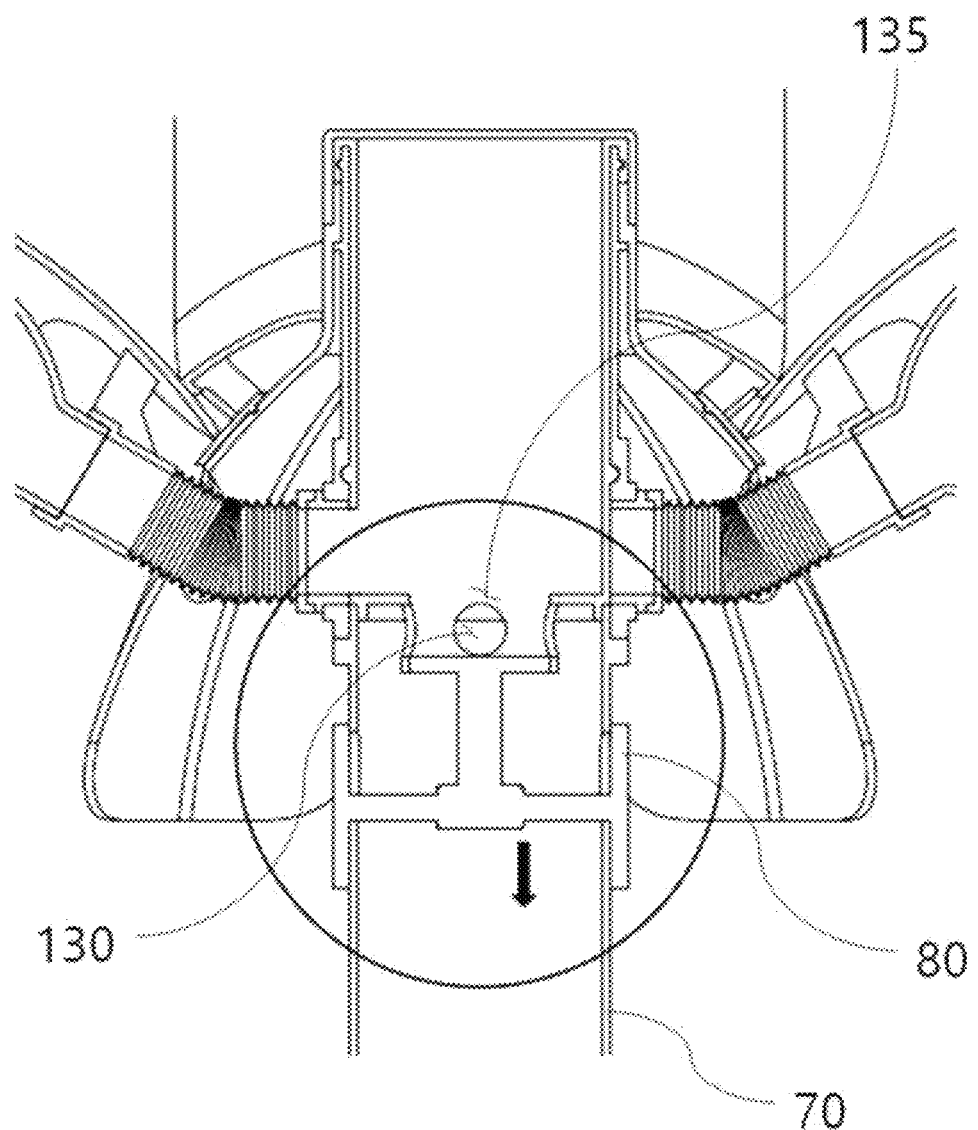
FIG. 12 is an enlarged sectional view showing a state in which the lower communication hole is opened in the portable liquid mixing device according to the aspect of the present invention.

FIG. 12 shows a state in which the lower communication hole 135 is opened. Referring to FIG. 12, the control disk is located at the end of the lower communication portion by pulling the control unit 80 downward, and the lower communication hole 135 and the communication radial hole 130 are opened. Furthermore, as in FIG. 11, the left side of the inner member 24 of the selection unit is opened, from which it may be determined that the left container is selected. In this case, the liquid in the left container may be moved to the accommodation space 110 of the selection unit. Furthermore, since the lower communication hole 135 and the communication radial hole 130 are opened, the liquid may be moved to the mixing space 71 of the mixing container 70 through these open holes.

Figure 13:
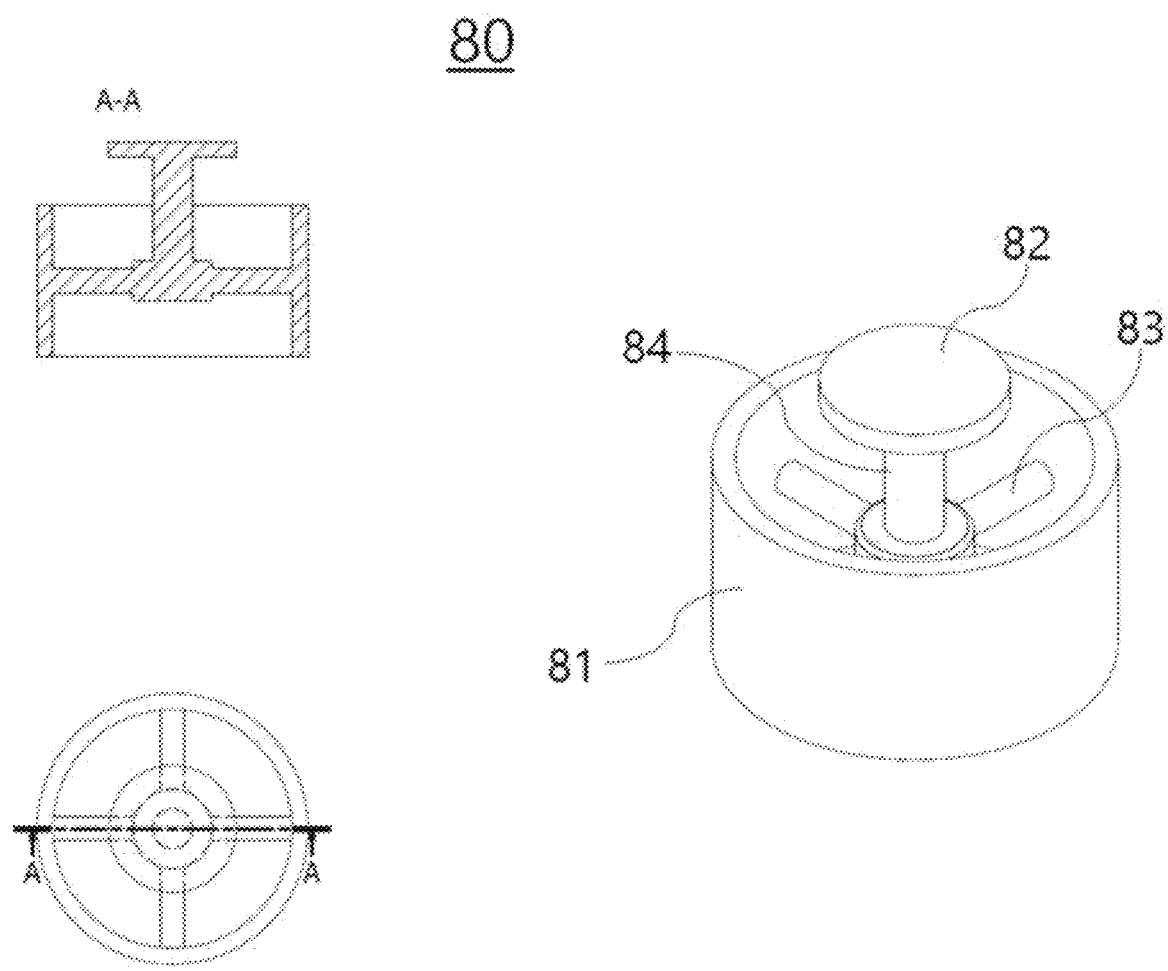
FIG. 13 is a view showing the control unit of the portable liquid mixing device according to the aspect of the present invention.

FIG. 13 shows the control unit 80. The control unit may function to control the movement of the liquid between the selection unit and the mixing container. The control unit may include the control disc 82, a support rod 84, a grip portion 81, and connection rods 83.

The control disk 82 is formed to match the lower communication hole formed in the lower portion of the selection unit. When the control disk blocks the through hole, the movement of the liquid is stopped; when the control disk 82 is lowered, the through hole is opened to allow the liquid to move (see FIGS. 11 and 12). The control disk 82 may be located inside the mixing container 70. The support rod 84 may be vertically formed on the lower surface of the control disk and support the control disk 82.

The grip portion 81 is a portion that is formed to exert a force from the outside in order to control the vertical movement of the control disc 82 and may be held by a hand. The grip portion 81 may be formed in a cylindrical shape outside the mixing container.

The connecting rods 84 may connect the cylindrical grip portion 81 located outside the mixing container 70 and the support rod 84 located inside the mixing container. The connecting rods 83 may be each formed in a radial form. The connecting rods 83 may connect the grip portion 81 and the support bar 84 by being inserted into and passed through the elongated through holes 73 formed in the mixing container 70.

Figure 14:
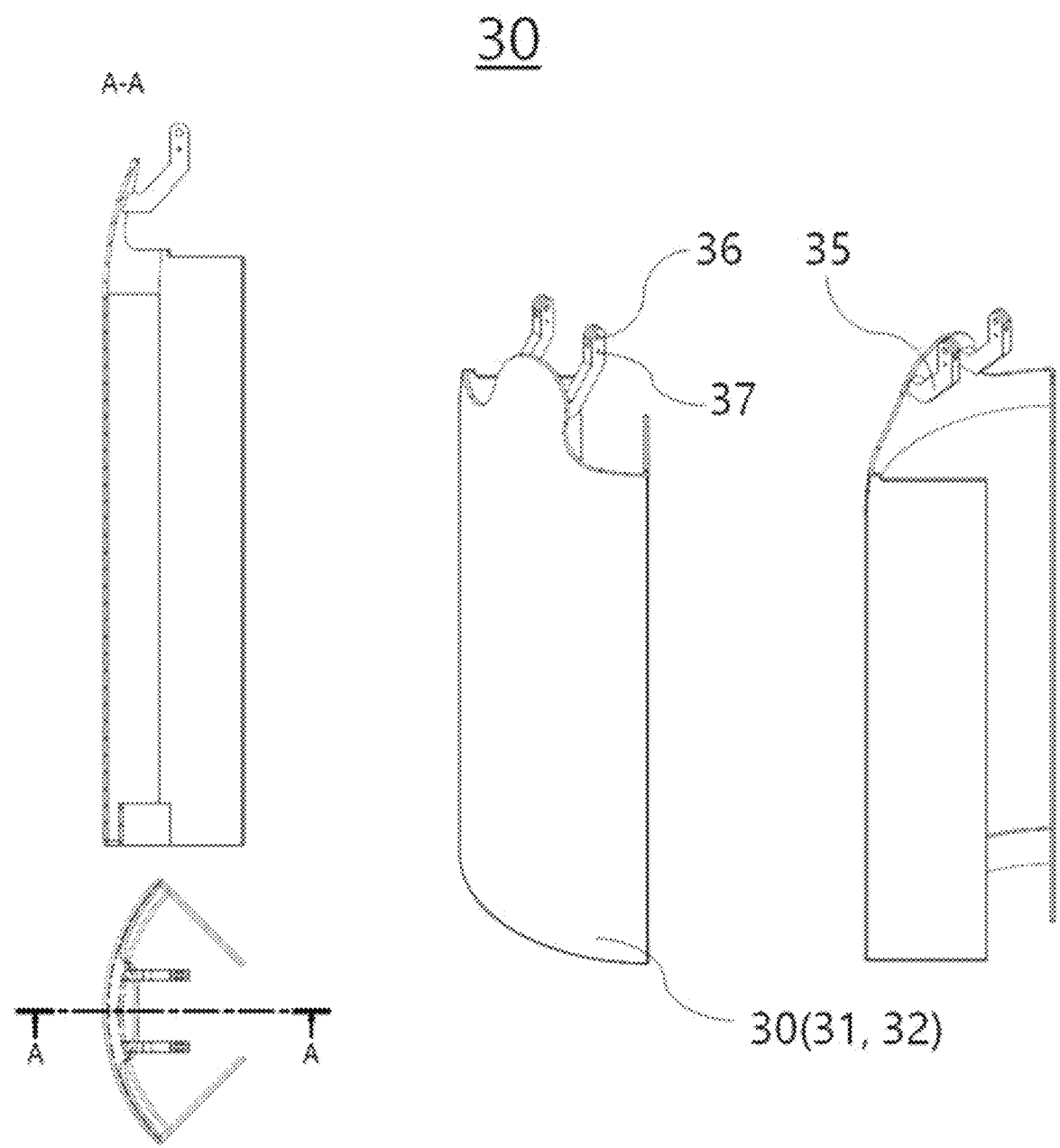
FIG. 14 is a view showing the side case of the portable liquid mixing device according to the aspect of the present invention.

FIG. 14 shows the side case 30. The side case 30 may accommodate the containers 60 containing liquids. Although a case in which the side case 30 includes four parts is shown in the drawing, it is not limited thereto, but may include two or more parts. The first arms 35 may be formed on the inner surface of the upper side case. A coupling slit may be formed at an end of each of the first arms 35, and a first coupling hole 36 may be formed perpendicular to the coupling groove. The first arms 35 may be coupled with the second arms 103 formed on the selection unit 90. Specifically, each of the first arms 35 and a corresponding one of the second arms 103 may be coupled to each other by inserting an end of the second arm 103 into the coupling slit formed at the end of the first arm 35, aligning the location of the first coupling hole 36 of the first arm 35 and the second arm 103 and the location of the second coupling hole 106 of the second arm 103, and inserting a coupling pin (not shown) passing through the first coupling hole 36 and the second coupling hole 106. The first arms 35 and the second arms 103 may be rotated around the coupling pins. When the side case is raised, the first arms 35 and the second arms 103 are rotated around the coupling pins so that the side case may be rotated upward (see FIG. 6).

The traction member 102 may be mounted on each of the first arms 35 formed on the side case 30. The traction member 102 may apply a force that promotes rotation when the side case is rotated upward (that promotes the upward rotation of the side case). Initially, when the side case is raised, it is started by applying external force through a hand of a person. When the side case starts to be raised, the side case may be naturally rotated upward by the force applied to the traction member 102.

Figure 15:
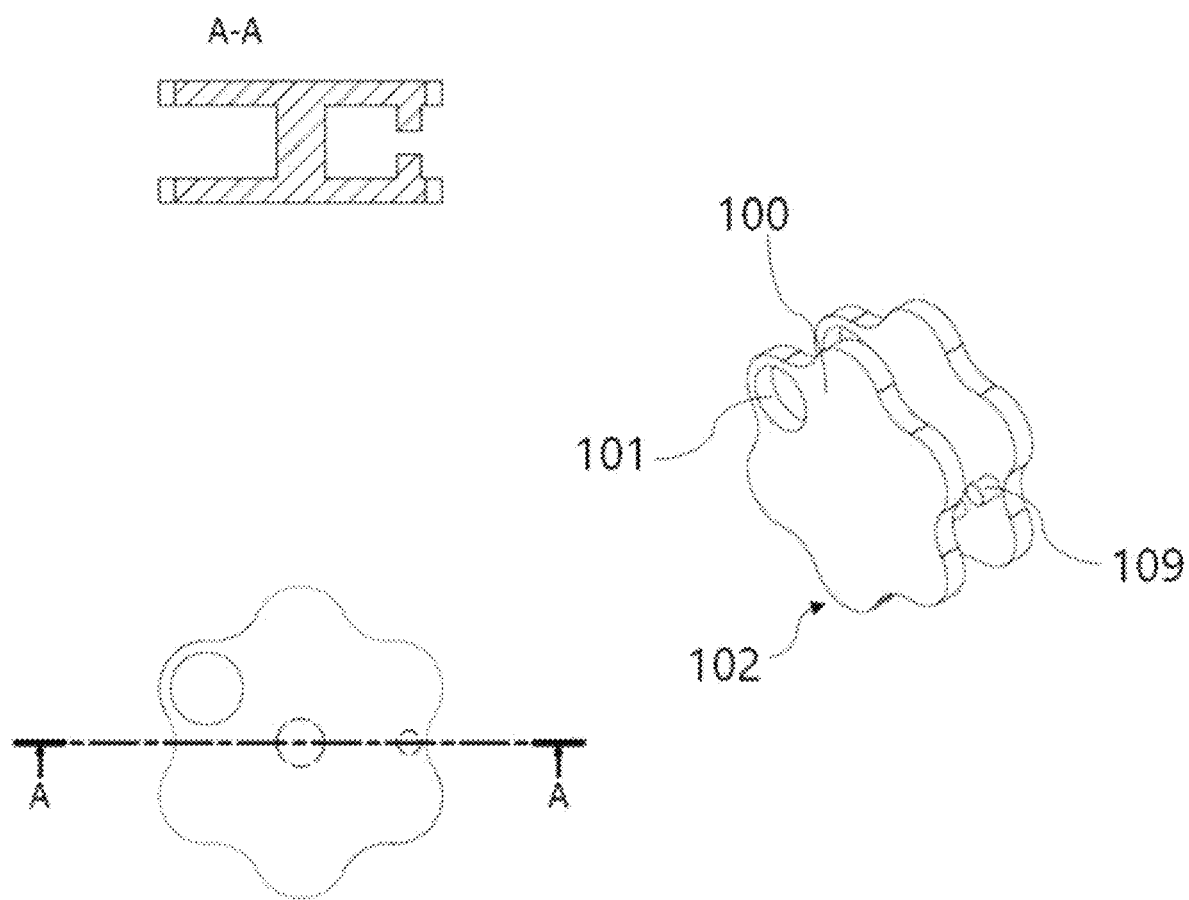
FIG. 15 is a view showing the traction member of the portable liquid mixing device according to the aspect of the present invention.

FIG. 15 shows the traction member. Referring to FIG. 15, the traction member 102 may have a structure in which two small plates 100 are connected to each other. A first magnet depression 101 is formed in the traction member 102 so that a first magnet may be mounted therein. A magnet depression 105 is also formed in the second arm 103 of the selection unit so that a second magnet may be mounted therein. The first magnet and the second magnet may have opposite polarities that cause an attractive force to act therebetween. The side case may be naturally raised by the attraction of the first magnet and the second magnet. As shown in the drawing, two traction members may be mounted on each part of the side case. The larger the number of traction members, the higher the attraction between the magnets, in which case the side case may be more easily raised.

Furthermore, the rotation limiting protrusion 109 may be further formed on the traction member 102. Even when the side case 30 is moved upward by the attractive force of the first and second magnets, it is necessary to determine the limit thereof. The side case is prevented from being rotated above a predetermined level by forming the rotation limiting protrusions 109. The locations of the rotation limiting protrusions 109 may be changed depending on how the rotation trajectory of the side case is set.

Figure 16:
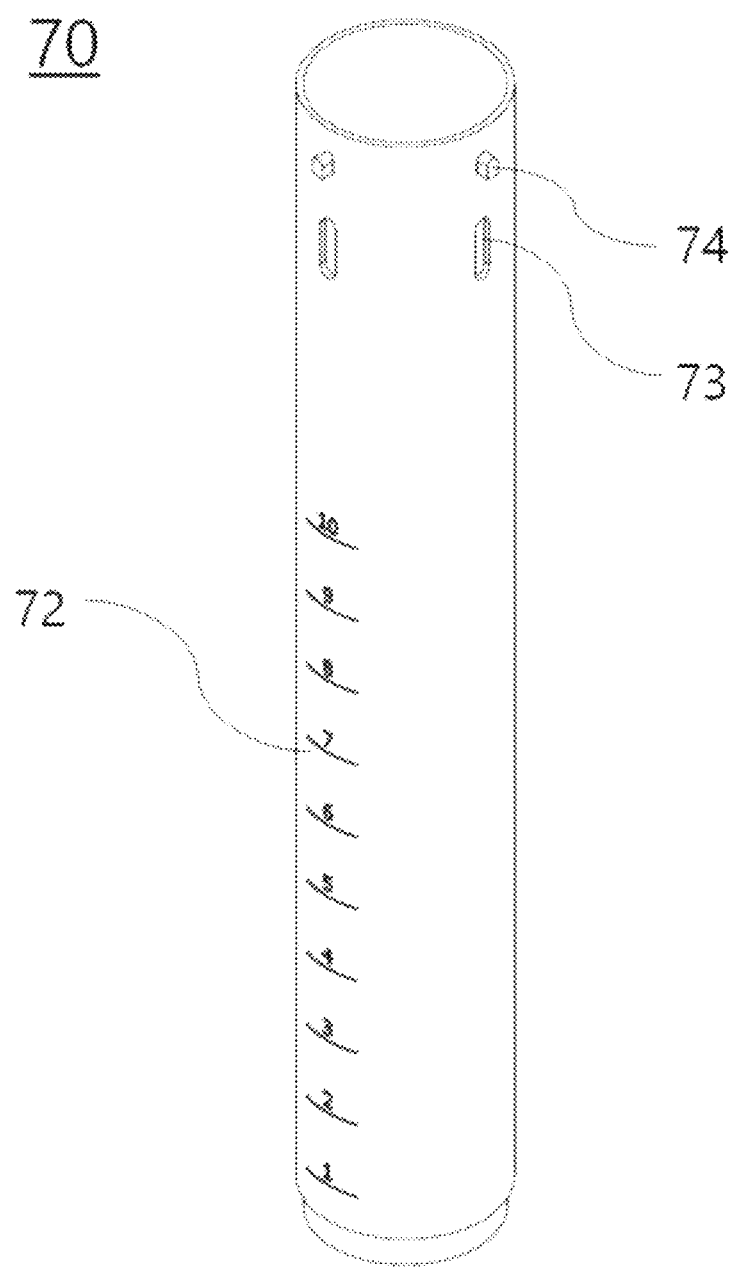
FIG. 16 is a view showing the mixing container of the portable liquid mixing device according to the aspect of the present invention.

FIG. 16 shows the mixing container 70. The mixing container 70 may be cylindrical. The mixing container 70 may be made of a transparent material to visually check the amount of liquid present therein. Transparent plastic as well as glass may be used. A scale 72 may be marked on the surface of the mixing container 70 so as to accurately check the amount of liquid. The diameter of the lower portion of the mixing container 70, to which a sealing portion 140 is coupled, may be smaller than the diameter of the upper portion. The elongated through holes 73, into which the control unit is inserted, may be formed in the upper portion of the mixing container 70. A plurality of elongated through holes 73 may be formed along the outer circumferential surface of the mixing container 70, and may be arranged symmetrically. Furthermore, a plurality of limit protrusions 74 may be formed to protrude outward on from outer circumferential surface of the mixing container 70 to prevent the control unit 80 from moving excessively upward.

The control unit 80 coupled to the top of the mixing container 70 may be moved up and down. When the control unit is moved downward, the lower communication hole 135 of the selection unit is opened so that the liquid present in the selection unit 90 may flow into the mixing container 70. When it is necessary to stop this, the inflow of the liquid may be stopped by moving the control unit upward and blocking the lower communication hole 35 of the selection unit. The limit protrusions 74 are formed to control the movement of the control unit to the extent that the lower communication hole 35 of the inner member 24 of the selection unit 90 may be accurately blocked. In other words, the locations of the limit protrusions 74 may be adjusted such that the lower communication hole 35 of the selection unit is blocked when the control unit is moved upward and reach the limit protrusions 74.

In the case in which liquids, such as beverages, are contained in the plurality of containers, when ice, cold water or a mixture of these is put in the mixing container, liquids, such as beverage coffee, contained in the containers may be kept cold due to the cold of the mixing container. In other words, the device according to an aspect of the present invention may be utilized as a cold-keeping device. Alternatively, when high-temperature water or the like is contained in the mixing container, liquids, such as beverage coffee, contained in the containers may be kept warm due to the warmth of the mixing container, in which case the device may be utilized as a warmth-keeping device.

Figure 17:
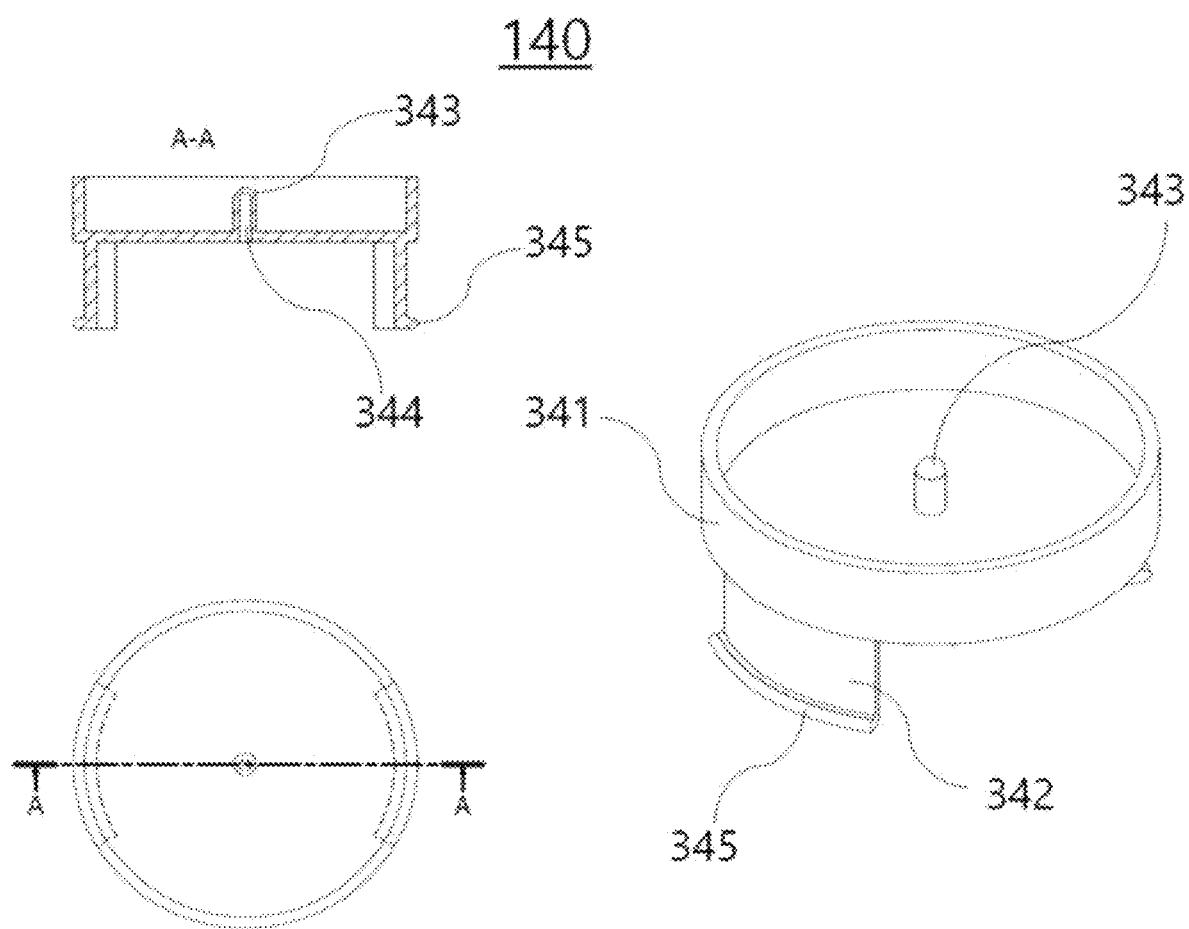
FIG. 17 is a view showing the sealing portion of the portable liquid mixing device according to the aspect of the present invention.

FIG. 17 shows the sealing portion 140 that is coupled to the lower end of the mixing container 70, seals the mixing container 70 and prevents the liquid inside the mixing container 70 from leaking to the outside. The sealing portion 140 may have a bottom surface having a disk shape, but may have a coupling wall 341 formed by extending the circumference of the disk vertically upward to a predetermined length. The coupling wall 341 may be coupled to the bottom of the mixing container 70. An indented protrusion 343 that is indented and protrudes upward may be formed at the center of the disk, and an indented hole 344 may be formed on the opposite side of the indented protrusion 343. The shaft rod of a motor 42 may be inserted into the indented hole 344. It is necessary that there is a sufficient clearance between the shaft of the motor 42 and the inner wall of the indented hole so that the inner wall of the indented hole 343 does not interfere with the rotation of the shaft of the motor 42. Legs are formed beneath the sealing portion 140 downward to support the seal portion 140. A plurality of legs may be provided, and the plurality of legs may be symmetrically formed to stably support the sealing portion 140. An outwardly bent protrusion 345 may be formed at the end of each of the legs 342. When the sealing portion 140 and the lower case 40 are coupled to each other, the sealing portion 140 and the lower case 40 are stably coupled to each other by forming grooves (not shown) configured to be coupled with the protrusions 345 in the lower case 30. When the sealing portion 140 is coupled to the mixing container 70, the sealing portion 140 forms the bottom surface of the mixing container 70. By coupling the mixing container 70 and the sealing part 140 to each other, the mixing container 70 is completed in terms of the performance of its function.

Figure 18:
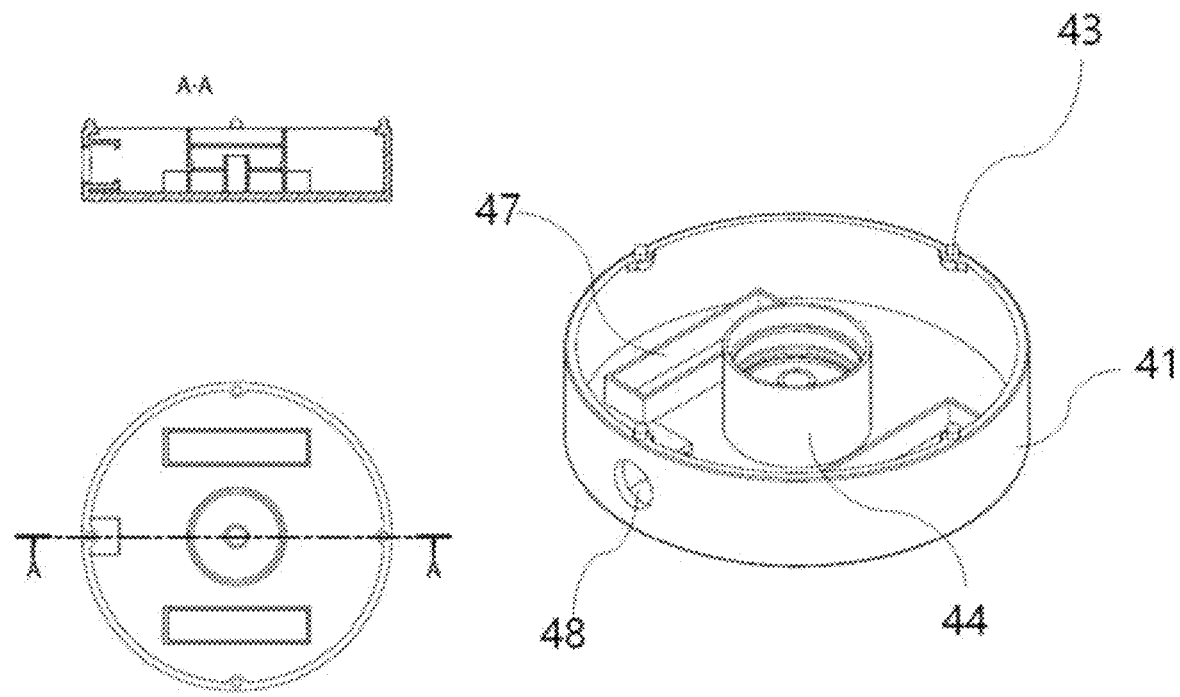
FIG. 18 is a view showing the lower case of the portable liquid mixing device according to the aspect of the present invention.
Figure 19:
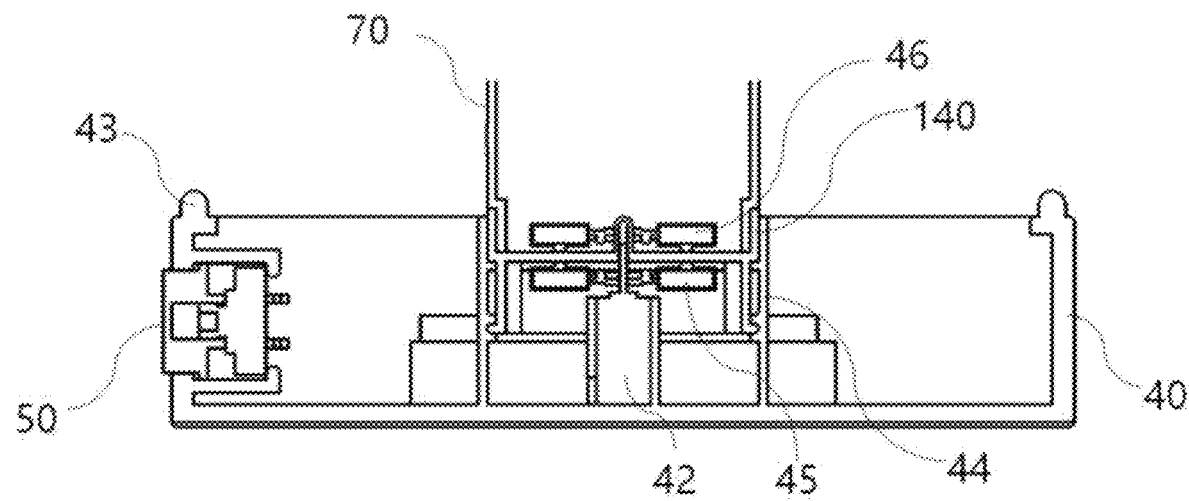
FIG. 19 is a partially sectional enlarged view illustrating a state in which the mixing container and lower case of the portable liquid mixing device according to the aspect of the present invention are coupled to each other.

FIG. 18 shows the structure of the lower case 40. FIG. 19 is a partially enlarged sectional view of a state in which the mixing container 70 and the lower case 40 are coupled to each other. The lower case 40 has a cylindrical structure in which the top thereof is opened upward and the bottom thereof is blocked, and a support coupling portion 44 having a small cylindrical structure is formed at the center of the lower case 40 and may be coupled with the sealing portion 140 through the support coupling portion 44. The motor 42 may be mounted vertically inside the support coupling unit 44. Furthermore, the lower case 40 may have a power supply accommodation portion 47 configured to accommodate a battery, etc. and a switch through hole 48 configured such that a power switch 50 capable of turning on or off power is mounted therein. When the power is turned on, the motor 42 may operate; when the power is turned off, the operation of the motor 42 may be stopped. Furthermore, protrusions 43 may be formed on the upper end of the side wall 41 of the lower case 40 and may be coupled to grooves 37 and 38 formed in the lower end of the side case 30. The number of protrusions 43 may be the same as the number of parts of the side case 30.

The protrusions 43 of the lower case and the grooves of the parts 37 and 38 of the side case may be engaged with each other by pushing the lower case 40 upward after bringing the parts 35 and 36 of the side case closer to each other. By the engagement, the side case 30 is fastened such that it is not opened sideways. In the case where the side case 30 is to be raised upward, when the lower case 40 is slightly pulled downward, the engagement between the protrusions 43 and the grooves 37 and 38 is released, and the case 30 may be raised upward by opening the side case 30 to the sides.

An inner rotor 46 may be mounted on the sealing portion 140, and an outer rotor 45 may be mounted beneath the sealing portion 140. The mixing container 70 is completed by coupling the sealing portion 140 to the mixing container 70. Based on the coupled state, the rotor present inside the mixing container 70 may be referred to as the inner rotor 46 and the rotor present outside the mixing container 70 may be referred to as the outer rotor 45.

The mixing unit may perform a function of mixing various liquids introduced into the mixing container 70. In the present invention, the mixing unit may include the inner rotor 46 located in the mixing container 70 and the outer rotor 45 present outside the mixing container 70. Both the inner rotor 46 and the outer rotor 45 include magnets, and can thus interact with each other through attraction and repulsion depending on the polarities of the magnets. When the outer rotor 45 is rotated by using the motor 42, the inner rotor 46 is also rotated accordingly, thereby generating vortices in the liquids in the mixing container 70 so that mixing is performed effectively.

Figure 20A:
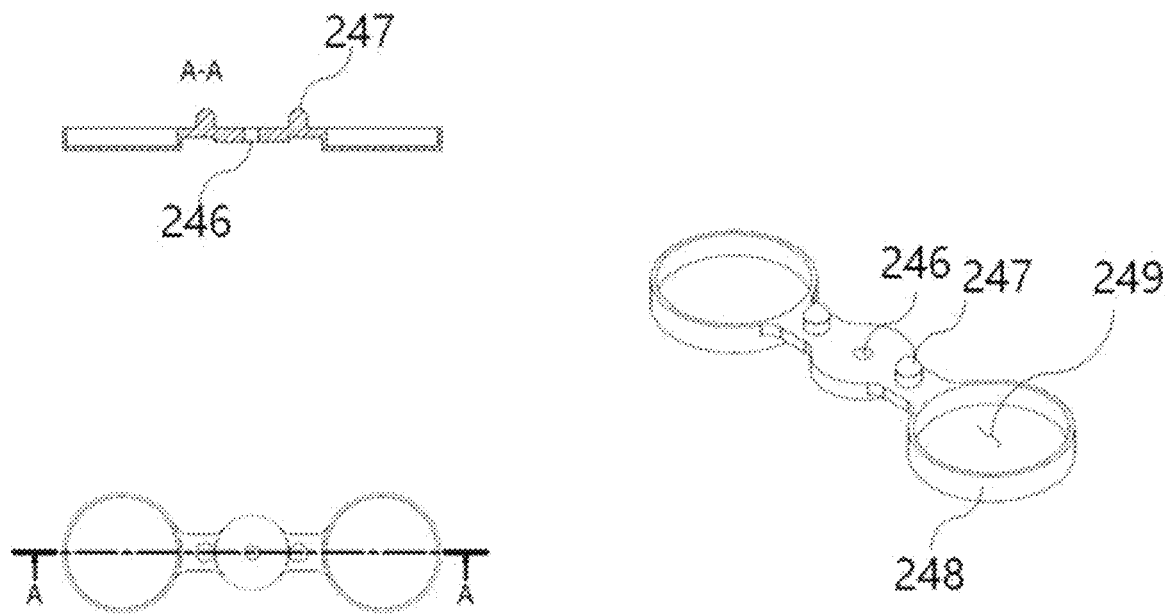
FIG. 20a is a view showing the lower member of the outer rotor of the portable liquid mixing device according to the aspect of the present invention.
Figure 20B:
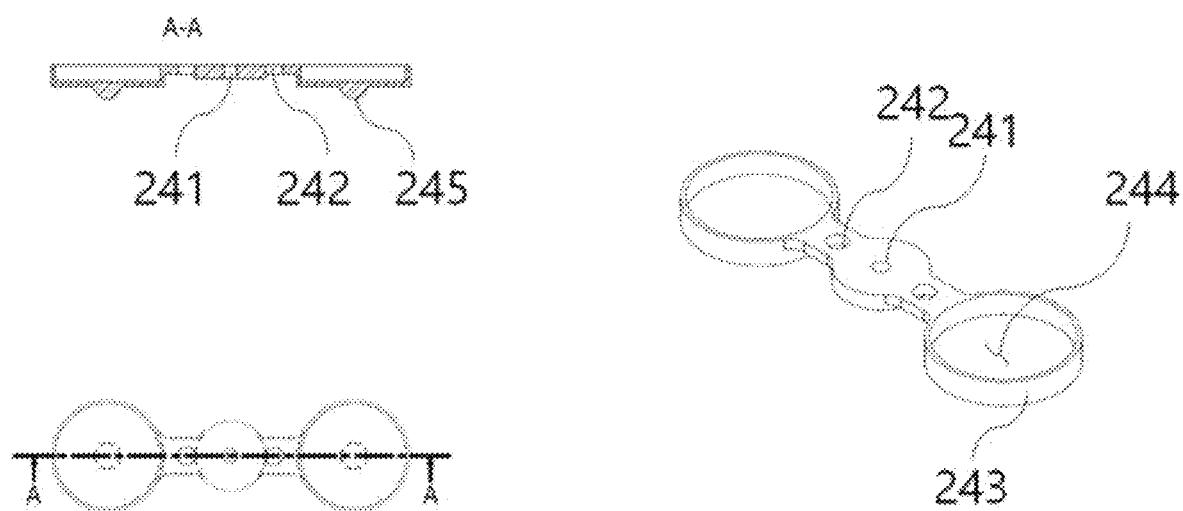
FIG. 20b is a view showing the upper member of the outer rotor of the portable liquid mixing device according to the aspect of the present invention.

FIG. 20a shows the lower member 45a of the outer rotor 45, and FIG. 20b shows the upper member 45b of the outer rotor 45. The upper member 45b of the outer rotor 45 is turned over and superimposed on the lower member 45a of the outer rotor 45, and thus they may be coupled to each other. During the coupling process, the coupling protrusions 247 of the lower member 45a may be inserted into the coupling holes 242 of the upper member 45b. The two members may be easily and accurately coupled to each other by performing coupling through the coupling holes 242 and the coupling protrusions 247.

Two magnet accommodating portions 244 and 249 configured to accommodate magnets (not shown) are formed at both ends of the outer rotor 45. The magnets may have disk shapes, and the magnet accommodation portions 244 and 249 may have disk-shaped accommodation spaces 244 and 249 capable of accommodating the disk-shaped magnets. The magnet accommodating portions may be mounted with magnets having different polarities.

Shaft holes 241 and 246 may be formed at the centers of the upper and lower members 245b and 245a of the outer rotor 245, and the rotational shaft of the motor 42 may be inserted into and coupled to the shaft holes 241 and 246. When the motor 42 is rotated, the outer rotor 45 may also be rotated accordingly. The size of the shaft holes 241 and 246 of the outer rotor 45 may be smaller than the sizes of the shaft holes 141 and 146 of the inner rotor 46.

Frictional protrusions 245 may be formed on the outsides of the bottom surfaces of the magnet accommodation portions of the upper member 45b of the outer rotor 45. The end portions of the frictional protrusions 245 of the upper member 45b of the outer rotor 45 may come into contact with the outer surface of the bottom of the mixing container 70. Through this configuration, when the outer rotor 45 is rotated, it may be possible to minimize friction with the bottom surface of the mixing container 70. In the case where the frictional protrusions 245 do not come into contact the outer surface of the bottom of the mixing container, when the outer rotor 45 is rotated, the outer rotor 45 may not come into contact with the outer surface of the bottom of the mixing container 70. Accordingly, the vibration of the outer rotor 45 may occur, and thus noise may be generated due to this vibration.

Figure 21A:
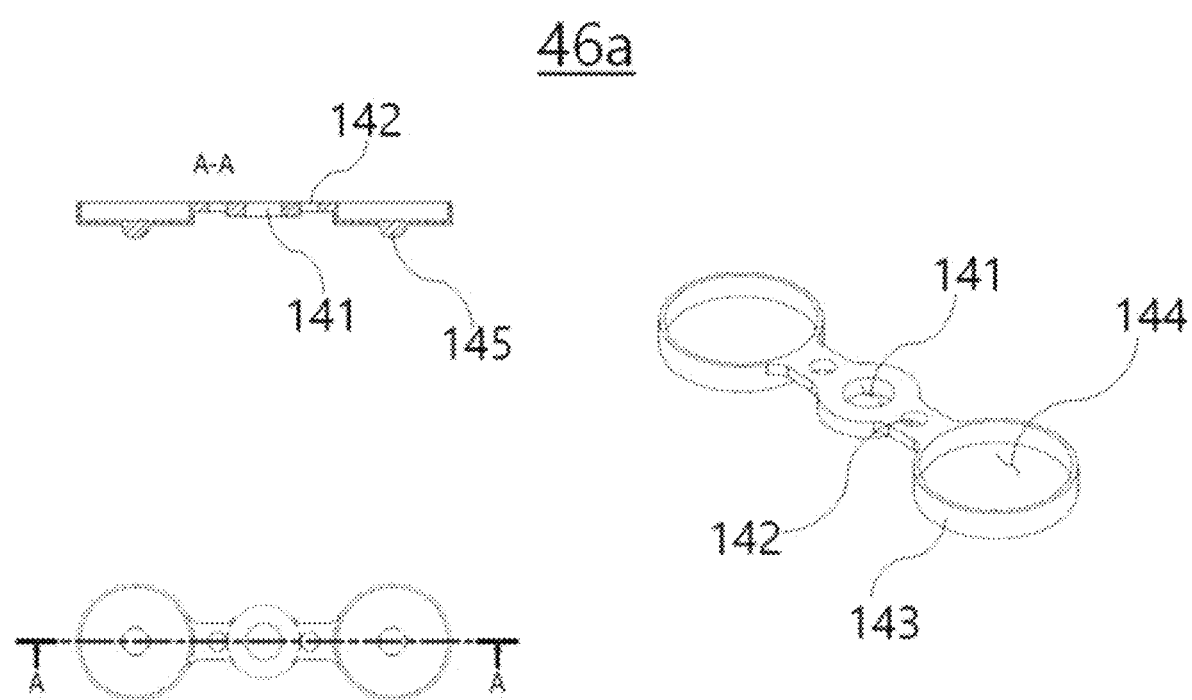
FIG. 21a is a view showing the lower member of the inner rotor of the portable liquid mixing device according to the aspect of the present invention.
Figure 21B:
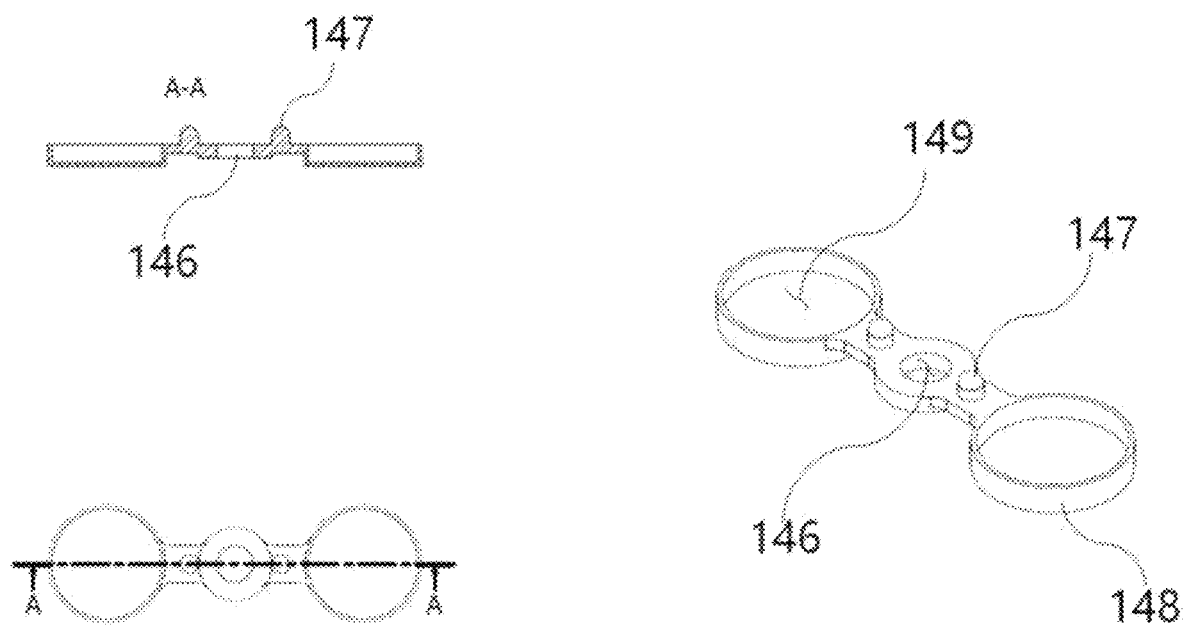
FIG. 21b is a view showing the upper member of the inner rotor of the portable liquid mixing device according to the aspect of the present invention.

FIG. 21a shows the lower member 46a of the inner rotor 46, and FIG. 21b shows the upper member 46b of the inner rotor 46. The upper member 46b is turned over and superimposed on the lower member 46a, so that they may be coupled to each other. In this case, the coupling protrusions 147 of the upper member 46b may be inserted into and coupled to the coupling holes 142 of the lower member 46a. The two members may be easily and accurately coupled to each other by performing coupling through the coupling holes 142 and the coupling protrusions 147.

Two magnet accommodating portions 144 configured to accommodate magnets are formed at both ends of the inner rotor 46. The magnets may have disk shapes, and the magnet accommodation portions 144 may have disk-shaped accommodation spaces 144 capable of accommodating the disk-shaped magnets. The magnet accommodating portions 144 may be mounted with magnets having different polarities. Due to the attractive force and repulsive force caused by the magnets, different polarities of the inner rotor 46 and the outer rotor 45 may be disposed closer to each other. Accordingly, when the outer rotor 45 is rotated by the rotation of the motor 42, the inner rotor 46 is also rotated accordingly. The liquids in the mixing container 70 may be mixed more effectively due to the rotation of the inner rotor 45.

Shaft holes 141 and 146 are formed at the centers of the upper and lower members 46b and 46a of the inner rotor so that the indented protrusions 343 of the sealing portion 140 may be inserted thereinto. In this case, it is necessary that there is a sufficient clearance between the shaft holes 141 and 146 and the indented protrusions 343 so that indented protrusions 343 do not interfere with the rotation of the inner motor.

Frictional protrusions 145 may be formed on the outsides of the bottom surfaces of the magnet accommodation portions of the lower member 45a of the inner rotor 46. The end portions of the frictional protrusions 145 of the lower member 46b of the inner rotor 46 may come into contact with the inner surface of the bottom of the mixing container 70. Through this configuration, when the inner rotor 46 is rotated, it may be possible to minimize friction with the bottom surface of the mixing container 70.

The terms used in the present invention are intended to describe specific embodiments, and are not intended to limit the present invention. Singular expressions should be considered to include plural meanings, unless the context is clearly stated to the contrary. The term "include" or "have" means the presence of features, numbers, steps, operations, elements described in the specification, or combinations thereof, but is not intended to exclude them.

The present invention is not intended to be limited by the above-described embodiments and the accompanying drawings, but is intended to be limited by the appended claims. Therefore, various forms of substitutions, modifications, and modifications may be made by those skilled in the art without departing from the technical spirit of the present invention as set forth in the claims, and they should be considered to fall within the scope of the present invention.

The invention claimed is:

1. A liquid mixing device capable of mixing a plurality of liquids, the liquid mixing device comprising:
    a first container configured to contain a first liquid;
    a second container configured to contain a second liquid;
    a selection unit connected with the first container and the second container via a first connection pipe and a second connection pipe, respectively, and configured to have a selective accommodates the first accommodation space that receives the first connection liquid by selectively opening pipe and/or also receives and only and accommodates the second liquid by selectively opening only the second connection pipe;
    a control unit configured to control introduction of a selected liquid into a mixing container;
    the mixing container configured to receive the first liquid and/or second liquid from the selection unit and to store and mix the first liquid and/or second liquid; and
    a mixing unit configured to mix liquids inside the mixing container;
    wherein the first liquid is introduced into the mixing container by selectively opening only the first connection pipe, the second liquid is introduced into the mixing container by selectively opening the second connection pipe, the first liquid and the second liquid are mixed together, the selection unit includes an outer member and an inner member mounted inside the outer member, and the outer member and the inner member are coupled to each other so that they are slidable when they are rotated;
    wherein the outer member has a cylindrical shape, and includes:

a plurality of outer through holes configured to communicate with the first connection pipe or second connection pipe;

a plurality of second arms formed on an outer circumferential surface thereof, and connected to first arms of the side case;

second magnet depressions formed on the second arms, and mounted with second magnets; and an inner circumferential groove formed along an inner circumferential surface thereof; and wherein the inner member has a cylindrical shape, and includes:

one inner through hole formed in a cylindrical wall thereof to correspond to the outer through holes;

a lower communication hole formed by extending a circumference of a lower end of a cylinder toward a center to a predetermined length;

a lower communication portion formed by extending an inner circumference of the lower communication hole downward to a predetermined length;

a plurality of communication radial holes formed in a cylindrical wall of the lower communication portion; and an outer circumferential strip formed along an outer circumferential surface thereof, and slidably coupled to the inner circumferential groove.

2. The liquid mixing device of claim 1, wherein the control unit comprises:

a control disk configured to have a same diameter as a diameter of the lower communication hole and thus seal the lower communication hole;

a support rod configured to support the control disk; and a grip portion connected to the support rod via a connection rod and configured to control movement of the control disk.

3. The liquid mixing device of claim 1, wherein the mixing container is configured such that:

it is made of a transparent material and has a cylindrical shape, a scale is marked on a surface thereof, a limit protrusion configured to limit movement of the control unit is formed on an outer circumferential surface thereof, and a sealing portion is coupled to a lower end thereof to prevent the liquid from leaking to an outside.

4. The liquid mixing device of claim 1, wherein the mixing unit comprises:

an outer rotor located outside the mixing container, and configured to have magnets having different polarities and to be rotated by driving of a motor; and an inner rotor located inside the mixing container, and configured to have magnets having different polarities and to be rotated according to rotation of the outer rotor.

5. The liquid mixing device of claim 1, further comprising a side case configured to accommodate the first container or the second container;

wherein the side case further includes a traction member formed in each of the first arms and configured to promote upward rotation of the side case; and wherein the traction member comprises:

a first magnet depression configured such that a first magnet is mounted therein; and a rotation limiting protrusion configured to limit the upward rotation of the side case to a predetermined degree.

* * * * *